United States Patent [19]

Jeffus et al.

[11] Patent Number: 5,210,789
[45] Date of Patent: May 11, 1993

[54] INTERACTIVE TELEPHONE OPERATOR TERMINAL

[75] Inventors: Stanley E. Jeffus, Garland; Barry D. Brown, Mesquite; Rockett O. Crawford; Michael L. Roerick, both of Carrollton, all of Tex.

[73] Assignee: International Telecharge, Inc., Dallas, Tex.

[21] Appl. No.: 723,232

[22] Filed: Jun. 28, 1991

[51] Int. Cl.⁵ ..................... H04M 3/60; H04M 3/64
[52] U.S. Cl. ............................ 379/127; 379/260; 379/223; 379/267
[58] Field of Search ............... 379/127, 260, 223, 227, 379/228, 265, 267

[56] References Cited

U.S. PATENT DOCUMENTS 4,777,647  10/1988  Smith et al. ..................... 379/151
4,947,422  8/1990   Smith et al. ..................... 379/200
5,012,512  4/1991   Basso et al. ..................... 379/260

OTHER PUBLICATIONS

Keyboard layout labeled "Tops Keyboard".
Operator handbook and keyboard labeled "DMS250-VAX Keyboard".

Primary Examiner—Stafford Schreyer
Attorney, Agent, or Firm—Richards, Medlock & Andrews

[57] ABSTRACT

Disclosed is a technique for presenting information to a telephone operator to enhance the efficient completion of telephone calls. Numerous data bases are generated to make available information concerning any type of telephone call with which the operator might be requested to assist or complete. The operator workstation is program controlled to access the various data bases and present information particular to that type of telephone call being serviced. Interaction between the operator and the workstation based on visual menus allows the operator to initiate access to the data bases for other or more detailed information which is displayed on menus and overlay menus.

47 Claims, 41 Drawing Sheets

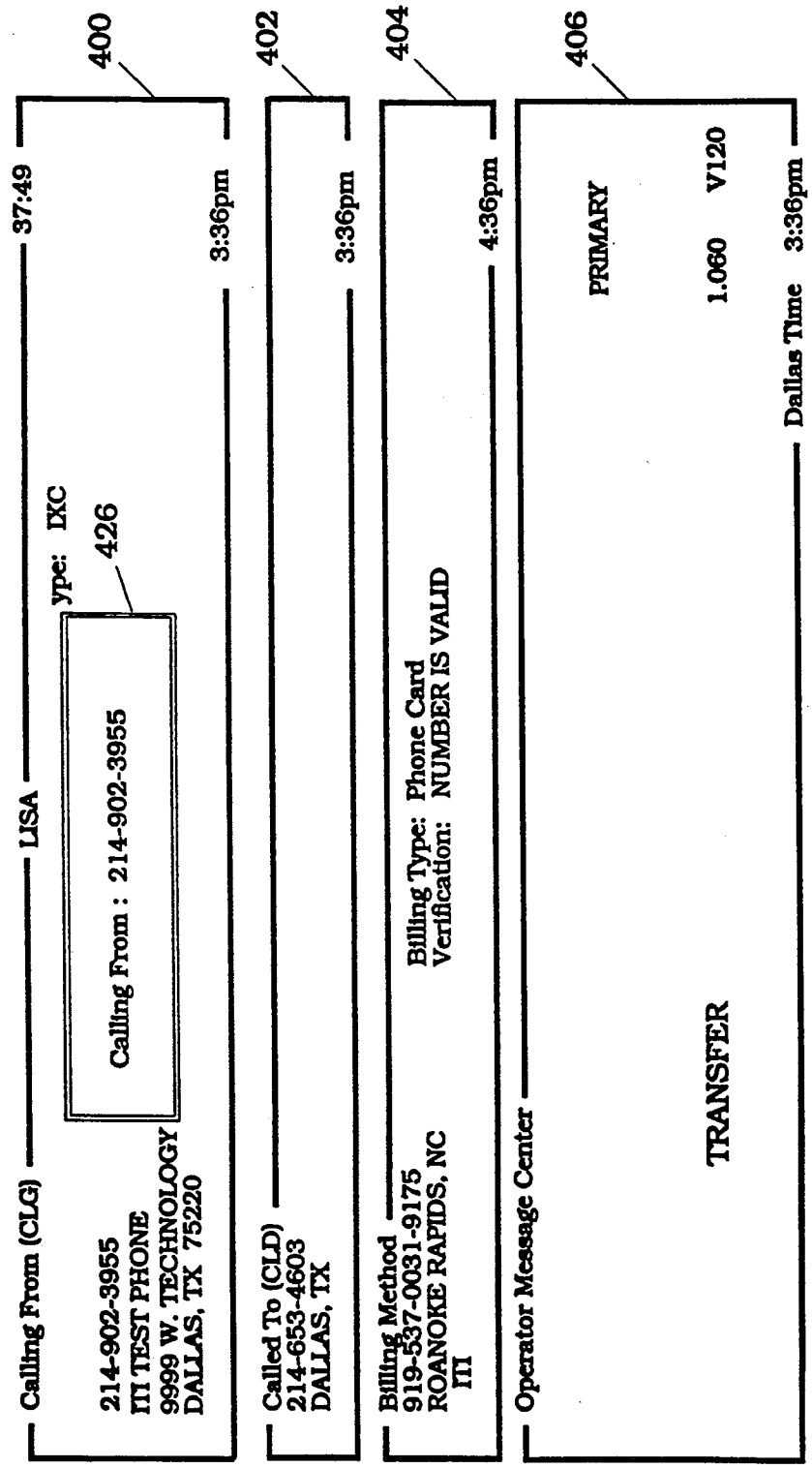

FIG. 5d

| General Information | | |
|---|---|---|

May 1991
| SU | MO | TU | WE | TH | FR | SA |
|---|---|---|---|---|---|---|
|  |  |  | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 |  |

June 1991
| SU | MO | TU | WE | TH | FR | SA |
|---|---|---|---|---|---|---|
|  |  |  |  |  |  | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | [26] | 27 | 28 | 29 |
| 30 |  |  |  |  |  |  |

July 1991
| SU | MO | TU | WE | TH | FR | SA |
|---|---|---|---|---|---|---|
|  | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 |  |  |  |

ITI
P.O. Box 50579
Dallas, Tx 75240

```
                    COIN REFUNDS/TROUBLE REPORTING
    REFUND/TROUBLE/CREDIT (R/T/C):   ENTER AMT. OF REFUND:
    NAME:                            STREET:
    CITY:                            STATE:          ZIP:
    HOME PHONE #: ( )                LOCAL PHONE CO.:

1. Str/Ma'am, are you calling from the phone that needs repair (Y/N):
    2. May I have the area code & number on the phone you are reporting?
         Phone #: ( ) -
    3. Is the phone located at (repeat Property Location) (Y/N):
    4. May I have the location of the phone you are reporting?
    ITI TEST PHONE        9999 W. TECHNOLO DALLAS      , TX 75220
    ITI
    PROBLEM REPORTED:
    1. Broken/Vandalized      6. Disconnects CLG and/or CLD
    2. Won't Accept Coins     7. Reached Wrong Number
    3. Won't Return Coins     8. Line Quality
    4. Won't Dial Direct      9. Other
    5. Keypad Not Working        Comments Field

TRANSFER
```

— 23:42 → 400
3:22 pm → 402
3:22 pm → 404
4:22 pm → 406

508

PRIMARY 1.060 V120    Dallas Time 3:22pm

FIG. 5f

```
Calling From (CLG) ——— LISA ——— 25:13 ─┐ 400
                                         │
214-902-3955         Phone Type: IXC     │
┌ MCI BRAND Credit Request ─── 510       │
│                                        ┘
│ Method of Billing:    Type of Call : _     ─┐ 402
│  1. Calling Card       1. Person to Person   │ 3:23 pm
│  2. Collect            2. Station to Station │
│  3. Third Party                               ┘
│  4. Major Credit Card  MCI Customer (Y/N) :  ─┐ 404
│                                                │ 3:23 pm
│ CLG Party Name : _____                     ┘
│ Street         : _____                    ─┐ 406
│ City           : _____ Zip: ____             │ 4:23 pm
│ State          : __                            ┘
│
│ Reason for Credit : 0
│
│  1. Poor Line Quality    2. Reached Wrong Number       RIMARY
│  SCRIPT: "I have entered your credit request, may I be of further
│          assistance?"                                1.060  V120
└
                    TRANSFER              ——— Dallas Time 3:23pm
```

FIG. 5g

UNITED STATES NPA REFERENCE  PAGE 1

| ALL POINTS | | ALL POINTS | ALL POINTS |
|---|---|---|---|
| ALABAMA | 205 | KENTUCKY | 207 | NORTH DAKOTA | 701 |
| ALASKA | 907 | LOUISIANA | | OHIO | |
| ARIZONA | 602 | MAINE | | OKLAHOMA | 503 |
| ARKANSAS | 501 | MARYLAND | | OREGON | |
| CALIFORNIA | | | | | 401 |
| COLORADO | | | | | 803 |
| CONNECTICUT | | | | | 605 |
| DELAWARE | | | | | 801 |
| DISTRICT OF C | | | | | 802 |
| FLORIDA | | | | | |
| GEORGIA | | | | | |
| HAWAII | | | | | |
| IDAHO | | | | | |
| ILLINOIS | | | | | |
| INDIANA | | | | NIA | 304 |
| IOWA | | | | | |
| KANSAS | | | | | 307 |

512 → 514

205 - ALL POINTS          AL

ALABAMA
205 - ABBEVILLE
205 - ALABASTER
205 - ALBERTA
205 - ALBERTVILLE
205 - ALEXANDER CITY
205 - ALICEVILLE
205 - ANDALUSIA

Enter City : _____

PRESS PAGE DOWN FOR CANADA AND CARRIBEAN ISLANDS

FIG. 5h

COUNTRY CODE REFERENCE  PAGE 1

| | CNTRY CODES | | CNTRY CODES | | CNTRY CODES |
|---|---|---|---|---|---|
| AFGHANISTAN | * | BOTSWANA | 267 | COOK ISLAND — 516 | * |
| ALGERIA | 213 | BURKINA FASSO | 226 | COSTA RICA | 506 |
| AMERICAN SAMOA | 684 | BRAZIL | 55 | CUBA | * |
| ANDORRA | 33628 | BRUNEI | 673 | CYPRUS | 357 |
| ANGOLA | | | | | 42 |
| ANTARCTICA | | | | AKIA | 45 |
| ARGENTINA | ARGENTINA | | 54 | | 253 |
| ARUBA | 91 - BAHIA BLANCA | | | REP. OF | * |
| ASCENSION ISL | 1 - BUENOS AIRES | | | AND | 593 |
| AUSTRALIA | 51 - CORDOBA | | | 518 | 20 |
| AUSTRIA | 783 - CORRIENTES | | | | 503 |
| BAHRAIN | 21 - LA PLATA | | | R GUINEA | |
| BANGLADESH | 23 - MAR DEL PLATA | | | ANDS | 251 |
| BELGIUM | 61 - MENDOZA | | | SLANDS | 298 |
| BELIZE | | | | DS | * |
| BENIN | Enter City : _____ | | | | 679 |
| BHUTAN | | | | | 358 |
| BOLIVIA | 591 | CONGA | * | FRANCE | 33 |

* - No Access (See Dialing Instructions)   PG DOWN FOR MORE COUNTRIES

FIG. 6b

PUBLIC PAYPHONES
BILLING METHODS ALLOWED

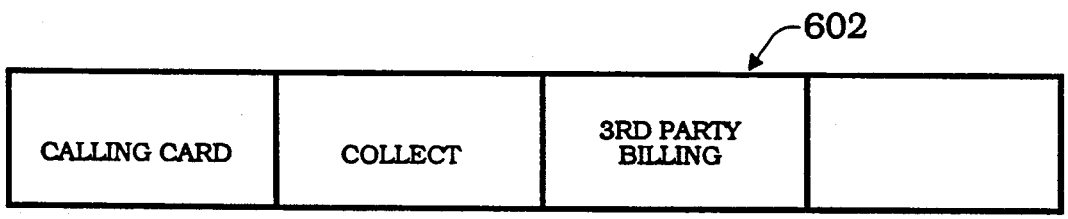

| CALLING CARD | COLLECT | 3RD PARTY BILLING | |

LOCAL OPERATOR = 0                    AT&T OPERATOR = 10288 + 0

INSTRUCT CUSTOMER TO HANG UP AND DIAL 0 FOR :

* EMERGENCY CALL
* COIN REFUND
* CHECK OR INTERRUPT BUSY LINE
* LOCAL DIALING INSTRUCTIONS
* INTRA/DIALING INSTRUCTIONS TO LOCAL OPERATOR

INSTRUCT CUSTOMER TO HANG UP AND DIAL 10288 + 0 FOR:

* AT&T OPERATOR REQUEST
* INTERNATIONAL COLLECT CALLS
* BLOCKED COUNTRIES
* NON-DIALABLE COUNTRIES
* INTERNATIONAL DIRECTORY ASSISTANCE

MOBILE
BILLING METHODS ALLOWED

SPECIAL INSTRUCTIONS

BAD ANI USE - 312-999-9999

NO TONE REP - CUSTOMER MUST WAIT UNTIL THEY
GET OFF THE BUS AND GO TO A REGULAR PHONE

BILL ALL 1-800 CALLS AND DIRECTORY ASSISTANCE CALLS

NO INTERNATIONAL CALLS ALLOWED

FIG. 6d

MCI SPECIFIC PROCEDURES

For Calls Branded MCI:        ⬅ 606
    ◇ If Customer needs credit, complete MCI Credit Request MCI Cards:
    ◇ Not a valid billing method for operator assisted call
    ◇ Give MCI Script to ANY customer who requests to bill to MCI card. Suggested Script:

> "When placing a call using the MCI card,
> - you will need to access a local line,
> - dial 950-1022 or 1-800-950-1022,
> - if MIC VNET, dial 1-800-950-1111,
> - wait for the computer tone,
> - (domestic) enter 0, the area code and telephone number.
> - (int'l) enter 01, the country code, city code and number.
>
> When you hear the next computer tone, you may enter the entire number that is on the front of your card.
>
> For further assistance, you call use the directions that are on the back of your MCI card."

FIG. 6e
IXC
BILLING METHODS ALLOWED

PAGE 1 OF 2

| CALLING CARD | COLLECT TO USA AND CANADA | 3RD PARTY BILLING | BILL TO CLG# ALLOWED |
|---|---|---|---|

← 608

SPECIAL INSTRUCTIONS

* NO TONE REPEAT
* DIAL "0" FOR:
  - EMERGENCY
  - INTERNATIONAL DIRECTORY ASSISTANCE
  - BUSY VERIFICATION OR LINE INTERRUPTION
  - LOCAL OPERATOR
  - INTERNATIONAL COLLECT

PAGE DOWN FOR NUMBERS

FIG. 6f

PAGE 2 OF 2

← 610

WHEN AN IXC CUSTOMER CALLS WITH QUESTIONS ABOUT HIS OR HER SERVICE, PLEASE REFER THEM TO THE FOLLOWING NUMBERS:

| | |
|---|---|
| AMERICAN TELCO NETWORK | 1-800-444-0258 |
| CALL AMERICA | 1-619-340-2112 |
| CHARTER NETWORK/GEORGIA/SOUTH CAROLINA | 1-800-627-1900 |
| CHARTER NETWORK/ALL OTHER STATES | 1-800-433-9274 |
| DIGITAL NETWORK | 1-800-777-0502 |
| LITEL | 1-800-837-1111 |
| METROMEDIA (ITT/USTS) | 1-800-221-4064 |
| NATIONAL TELEPHONE EXCHANGE | 1-800-234-5130 |
| PHONE ONE | 1-800-852-4154 |
| TELAMERICA | 1-800-777-9020 |
| CYTEL | 1-800-583-0203 |
| LDS | 1-800-284-4491 |

IF A CUSTOMER DOES NOT KNOW THE NAME OF HIS/HER LONG DISTANCE CARRIER, ASK THE CUSTOMER TO HANG UP AND DIAL   1-700-555-4141

PAGE UP FOR INSTRUCTIONS

FIG. 6g

| CALLING CARD | MAJOR CREDIT CARDS | FOR: | HOTEL/HOSPITAL TELE CELLULAR |
|---|---|---|---|

MESSAGE FORWARDING
BILLING METHODS ALLOWED — 612    613

SPECIAL INSTRUCTIONS

CALL TO: U.S.A. (ALL 50 STATES)
PUERTO RICO
U.S. VIRGIN ISLANDS

SCRIPT: "You may leave a one-minute message following the recorded instructions. The cost is $3.00. We'll attempt to complete your call every 30 minutes for the next eight hours. Thank you for using ITI".

STEPS:
1. OBTAIN BILLING METHOD
2. INPUT THE CLD#
3. PRESS ENTER

CLD #: 214-653-4603

PRESS ENTER TO ACTIVATE

FIG. 9c

DEBUG SCREEN

1. SET ENVIRONMENT VARIABLES
2. RESET ENVIRONMENT VARIABLE FLAGS
3. VIEW CONNECTION INFORMATION

9. SET CALL INFO HOT KEY - NONE
10. SET PRINT SCREEN HOT KEY - 320

Enter Option:_____

INTERACTIVE TELEPHONE OPERATOR TERMINAL

TECHNICAL FIELD OF THE INVENTION

The present invention relates in general to telephone operator service positions, and more particularly to methods and apparatus for enhancing the completion of long distance telephone calls using workstations programmed to make information available from various data bases, dependent on the type of service required.

BACKGROUND OF THE INVENTION

Telephone communications have become a commonplace technique for exchanging information. In the business environment, as well as even on a personal basis, long distance telephone communications are carried out to enhance the flow of information. While many long distance telephone communications can be carried out by direct dial techniques, there are still a host of instances and situations in which operator assistance is required. Indeed, in recent years, the provision of independent operator services has experienced significant growth. This growth is due in a large part to the competition between long distance telephone carriers themselves, as well as "smart" telephone sets. Smart telephone sets are described in U.S. Pat. Nos. 4,924,497 and 4,947,422, the disclosures of which are incorporated herein by reference.

Smart telephone sets comprise a new generation of public and private telephones that are processor controlled, and programmed to provide a variety of different functions. Such telephones can be privately owned, but publicly used. In addition, these telephones are programmed to automatically access a particular operator service organization when the need arises. For example, such services are required with many types of telephones when a long distance call is a collect type or a credit card type of call. In a typical credit card type of call, a user of such a telephone may simply dial "0" and the ten-digit long distance telephone number. The telephone is programmed to automatically route the call to a specified operator service organization, whereupon either computerized equipment or personnel intervene to assure that the proper billing arrangements exist in order to complete the call. In practice, there exists various operator services that serve the continental United States as to the completion of calls on an international basis. It can be appreciated that such a service organization can receive thousands of calls every hour. Indeed, a typical operator can provide long distance assistance and complete a call every 15-30 seconds.

Because of the numerous types of telephone calls and situations which an operator may encounter, a significant amount of information must be available to each operator. For example, not only must an operator be capable of completing routine credit card calls, collect calls, person-to-person calls, but must also accommodate the calling parties with information relating to the cost of the call, the local time of the destination, customer service information, repair information, installation information, overseas communications, bilingual communications, area code information for every domestic geographical area as well as country code information for every country in the world, and other information.

In the past, long distance operators in general have had such information available, albeit in a very unorganized manner and often very difficult or time consuming to retrieve. For example, many operator organizations have three-by-five card files of relevant information used in assisting calling parties, such as area codes, which the operator manually thumbs through to find the appropriate area code. Not only is this cumbersome, but also area codes frequently change and new codes are generated, whereupon each card file must be manually updated. In addition to the use of card files, publications, and catalogs, other operator service organizations have available computerized terminals driven by a host that presents certain information concerning the calling party. The operator is equipped with a headset to communicate to such calling party information, such as billing information in the nature of credit card numbers or a destination telephone number for collect call purposes. In practice, the information presented on such terminals is in the nature of many pneumonics which must be memorized by the operator in order to effectively communicate with the host communication system and understand the data base information. For example, the pneumonic "CLG1" presented on the screen to the operator may mean that the calling party has hung up, while the pneumonic "CLD1" displayed on the CRT may indicate that the called party was disconnected. Not only was the operator required to decipher much of the cryptic information presented on the CRT, the operator also had to input by way of a keyboard substantial information for communicating back to the host communication system. Essentially, such a system was not "user friendly" and therefore was difficult to become accustomed to by new operators.

From the foregoing, it can be seen that a need exists for an improved technique for both presenting information to the operator in an uncomplicated and efficient manner, as well as for return information from the operator back to the host communication system. Another need exists for an improved technique for presenting information to the operator which is user friendly to allow easy interaction with the host computer. Yet another need exists for an improved programming technique for use with operator positions where various selectable menus are available, and the entries within the menu are preselected by the software based on being the most likely to be selected, and there is reduced scanning of the menu entries by the operator before selection.

SUMMARY OF THE INVENTION

In accordance with the present invention, the methods and apparatus substantially reduce or eliminate the disadvantages and shortcomings associated with the prior art techniques. According to an important feature of the invention, computerized equipment is programmed to present in an orderly and organized manner substantial information to a telephone operator during various stages of the call to facilitate assisting the calling party. The prior used mnemonics and abbreviations are substantially eliminated in favor of English text prompts which are segregated into windowed areas for easy identification as to function and use. Moreover, in progressing through the information of one or more of the windowed areas, the operator can select other tables that are more specific as to the information in each window. The selected specific information is overlaid under computer control on prior information, and can be automatically removed for return to the original screen information. According to a special feature of the invention, in various menus that are selectable by the operator, the computer is programmed to highlight the item that is most likely to be selected so that paging up or down the menu for selection is minimized.

In accordance with the preferred embodiment of the invention, new centralized data base files are created for storing substantially all conceivable information required by an operator in servicing any type of long distance telephone inquiry. Each processor in an operator's workstation is individually programmed to access the various centralized files to retrieve the appropriate information and display the same to the operator. The workstation processors are interrupt-driven in response to keyboard entries by the operator, response to requests and information from the switch, and response to requests and information from the local area network (LAN), to quickly retrieve the information, act thereon, and either present the information to the operator, or provide a further visual prompt to solicit the input or selection of additional information necessary to complete the assistance. In this manner, the operators can simply follow the instructions on the screen and input data based upon information received from the calling party. The sequence of procedural aspects required of the many types of call assistance by the operators is thereby facilitated, and training of new operators is enhanced.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or elements throughout the views, and in which:

FIGS. 4a-4m illustrate a base screen display and various other overlay screen displays produced by the operator terminal in the course of assisting calling parties;

FIGS. 5a-5h illustrate other operator terminal screen displays utilized by an operator in carrying out service requests with respect to incoming calls;

FIGS. 6a-6g are screen displays of various service menus available to operators to assist calling parties;

FIGS. 9a-9c are screen displays to facilitate programmers and engineers to support special testing of software and hardware functions.

DETAILED DESCRIPTION OF THE INVENTION

Figure 1:
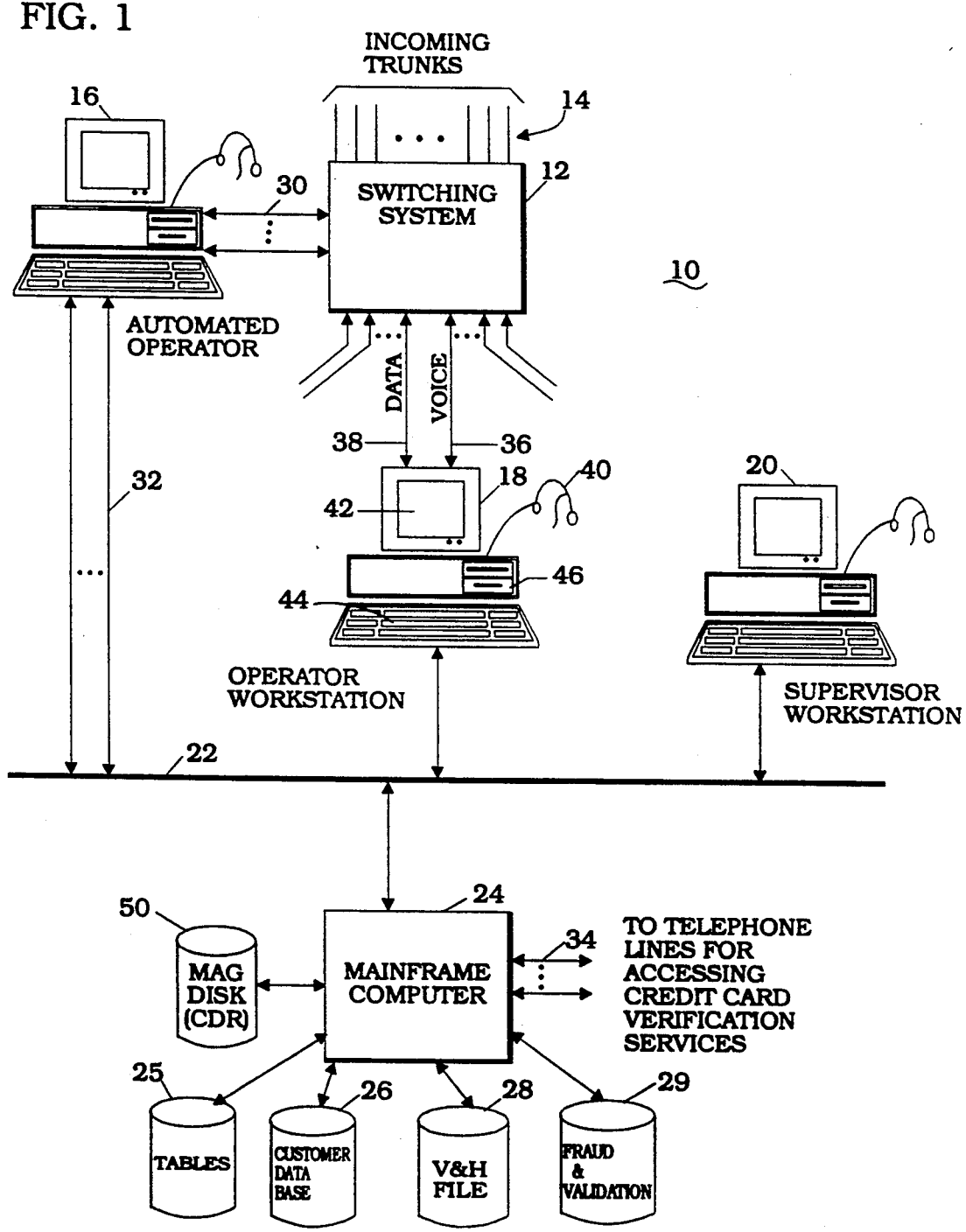
FIG. 1 is a generalized diagram of the overall system for providing operator assistance to calling parties.

The operator services equipment 10 adapted for use with the present invention is shown in FIG. 1. A telecommunication switching system 12, such as a Northern Telecom DMS250 switch, provides a voice switch interface between a number of incoming trunks 14 and the system 10. Other input lines to the switching system 12 may include microwave links, satellite channels, overseas trunks, etc. The trunks 14 can be of the type connected to a tandem or other type of long distance carrier for providing voice communications between the operator services system 10 and any telephone in the world. The switching system 12 is of the program controlled type which can initially direct all incoming calls to automated voice prompt equipment 16, or if such unit 16 cannot completely service the call request, the switching system 12 redirects the calls to an available operator workstation, such as shown by reference numeral 18. In a typical system 10, there may be 100, or more, operator workstations 18 manned by personnel to service calls incoming throughout any part of the United States for rerouting the same to any country in the world. Also connected to the switching system is a supervisor workstation 20. The workstations 16, 18 and 20 are of the type that are IBM AT compatible and are connected to a local area network 22, of the Ethernet type, that provides a data connection between the equipment of the operator services system 10 and a mainframe computer 24, functioning as the network file server. Included on the network are a number of data bases 25, 26, 28 and 29 that can be accessed for distribution of data to the system equipment via the network 22. The mainframe computer 24 is of the type DEC VAX 6330, four of which form a calypso cluster. The mainframe computer 24 includes a data base of various tables 25 required in processing long distance telephone calls, for example, a table of country and city codes needed for overseas calls. A customer data base 26 for storing all the customer data information that may be utilized to complete the many types of long distance telephone calls. A vertical and horizontal file (V&H) 28 is also a data base for storing area code, LATA and other information. A fraud and validation data base us used to store information about telephone billing numbers that have been identified as being invalid. The data bases 25, 26, 28 and 29 will be described in more detail below.

The basic operation in providing operator services is carried out as follows in connection with the preferred embodiment of the invention, although it should be understood that the principles and concepts of the operator services system 10 can be implemented in a variety of different ways, and situated in operator service environments different from that described herein. The system 10 is well adapted for use with smart-type pay station telephones, such as described in U.S. Pat. No. 4,947,422 noted above. The entire disclosure of such patent is incorporated herein by reference. With such type of telephone, and in a credit card type of call, a user can simply dial "0" plus the 10-digit number of the party with whom communications are desired. The digits input by the calling party are temporarily stored in the telephone set. In response to such input, the telephone set automatically outpulses digit information effective to allow the telephone to be connected via the public switching network to the operator services system 10. As can be appreciated, the operator services 10 can be located in one or more cities of the United States, and connectable to any telephone set capable of dialing the director number, or numbers, associated with the system 10.

In any event, information transferred to the switching system 12 by way of the incoming trunks 14 includes the trunk group, an automatic number identification (ANI) that specifically identifies the pay station telephone set itself, and a terminating number identification (TNI) that corresponds to the area code and directory number of the called party with whom communications are desired. In response to the incoming call, the switching system 12 automatically reroutes the incoming call first to the automatic voice prompt equipment 16, by way of one of the audio lines designated as numeral 30. The voice prompt unit 16 is programmed to respond to the incoming call by providing a voice prompt to either input a credit card number or to press the telephone key pad "0" for connection to a live operator. In the event a credit card number is input, such information is received from the calling party by the voice prompt unit 16 by way of DTMF signals that are decoded into binary digits. The voice prompt unit 16 is then programmed to interrogate the mainframe computer 24, via one of the lines 32 and the network 22. In response, the mainframe computer 24 is adapted to outpulse digits for connection of the system 10 to another service that provides credit card validation or verification. The mainframe computer 24 accomplishes such connections by way of lines 34 that are of the X.25 protocol type. If the credit card information is valid, an appropriate signal is received from the verification services and coupled to the voice prompt unit 16. The unit 16 then provides a signal back through the switching system 12 and incoming trunks 14 to cause the calling party to be connected via the public telephone system to the desired destination. If, on the other hand, the credit card verification is a negative response, an appropriate signal is returned from the verification services to the voice prompt unit 16, and another voice prompt is returned to the calling party to the effect that the card is invalid and to either input another credit card number, hang up, or press "0" to be connected to a live operator.

Incoming call requests directed to an available operator workstation 18 are provided from the switching system 12 by way of a dedicated voice line 36 and data line 38. The workstation 18 can be equipped with either an internal or external modem connected to the data line 38. An operator working at the workstation 18 can use the headset 40 for listening and talking to the calling party via the voice line 36. In addition, the remote switching system connected to the calling party can transfer ANI, TNI, trunk group and class type of information to the workstation 18 by way of the data line 38.

The workstation 18 includes a CRT screen 42 by which either the switching system 12 or the mainframe computer 24 can provide visual information to the operator. In addition, the workstation 18 includes a keyboard 44 so that the operator can input data in response to a sequence of various screen menus to provide full service for the particular type of inquiry by the calling party. The workstation 18 includes a processor (not shown) and one or more disk drives 46 for storing the program according to the invention. Based on the ANI input to the workstation 18 via the data line 38, the workstation processor can interrogate the mainframe computer 24 to access the customer data base 26. Information cross-referenced to the particular ANI number of the calling party telephone in the data base 26 is returned to the workstation 18 and displayed on the workstation screen 42. Such information allows the operator to then know information particular to the telephone set used by the calling party, such as the city and address, the local time of the calling party, emergency numbers, dialing and special instructions, the ANI number itself and the type of telephone, such as coin, or non-coin, hotel, etc.

With respect to the TNI information forwarded by the telephone set to the switching system 12, the operator workstation processor accesses the mainframe computer 24 for reading the V&H file 28 to determine further particularities with respect to the called party. Information is returned to the operator workstation 18 and displayed on the screen 42 to inform the operator of the number dialed by the calling party, the city and address of the called party, as well as the local time at the destination. In addition, and to be described in more detail below, a screen menu concerning billing information is automatically displayed on the workstation screen 42 to assist the operator in entering appropriate information to complete the call and to assure that adequate billing and collection information for the charges is available and properly recorded.

In addition, the operator workstation processor receives from the V&H file local access transport area (LATA) data to determine if indeed the call can be completed by the operator services organization. For example, certain governmental and regulatory restrictions prevent various operator services from completing intra-LATA calls, but allow inter-LATA calls to be completed. LATA boundary information is stored in the data base 28 and made available to the workstation 18 so that based on the ANI, TNI and LATA information, a decision can be automatically made by the processor and displayed on the workstation screen, thereby removing a certain amount of decision making by the operator. Hence, an operator does not need to analyze such information, nor purposefully consult either data base tables or card catalogs to make a decision whether the call can be completed. On a negative determination that the call can be completed via the system 10, the workstation 18 is programmed to prevent the operator from completing a connection, whereupon the operator informs the calling party by way of the voice line 36, and returns a signal to the remote switching system for connection to a local operator.

On an affirmative determination that the call can be completed, the operator again consults the screen menus concerning further information required to complete the call. For instance, the operator can communicate with the calling party to determine if the call is to be a credit card type, collect or other type of payment arrangement. In the event the call is to be charged to a credit card, the operator inputs a single keystroke on the keyboard 44 in response to the appropriate menu highlight, whereupon the mainframe computer 24 is caused to access the credit card verification services. Again, on an affirmative verification, an indication thereof is displayed to the operator, and the operator can input via the keyboard 44 information for allowing the public switching system to complete a connection to the called party associated with the TNI.

On the other hand, if the call is to be a collect type of call, the operator can simply enter another key command on the keyboard 44 to cause the switching system 12 to outpulse the TNI number for allowing the operator to communicate with the called party. The operator can then communicate with the called party and determine whether the collect call billing arrangement is approved. If so, the operator can again provide an input by way of the keyboard 44 to cause the switching system 12 to output signalling information for allowing the public switching network to connect the calling party to the called party. A magnetic disk unit 50 is utilized by the mainframe computer 24 to record the calling detail records (CDR) that are transferred to the billing process.

As can be appreciated, each operator workstation 18 is independently programmed and is table driven to provide a fast response and provide complete information from the various data sources to the operator by way of the CRT screen 42. The workstation 18 and operator can interact using the visual output on the screen 42 and the manual input by way of the keyboard 44. In addition, the processor within the workstation 18 is programmed to provide a sequence of menus on the screen and respond to keyboard inputs by way of interrupt structures and circuits to achieve a highly responsive system so that the operator can serve numerous incoming inquiries in a short period of time. With such simplified situations, the training of operators is also facilitated.

The supervisor workstation 20 is programmed and connected to the network 22 in a manner similar to the operator workstations 18. In addition, the supervisor workstation 20 is programmed to receive data concerning the busy-idle status of the numerous operator workstations 18, as well as gather other data and statistics concerning the performance and efficiency of the system 10, as well as the individual operators.

Figure 2:
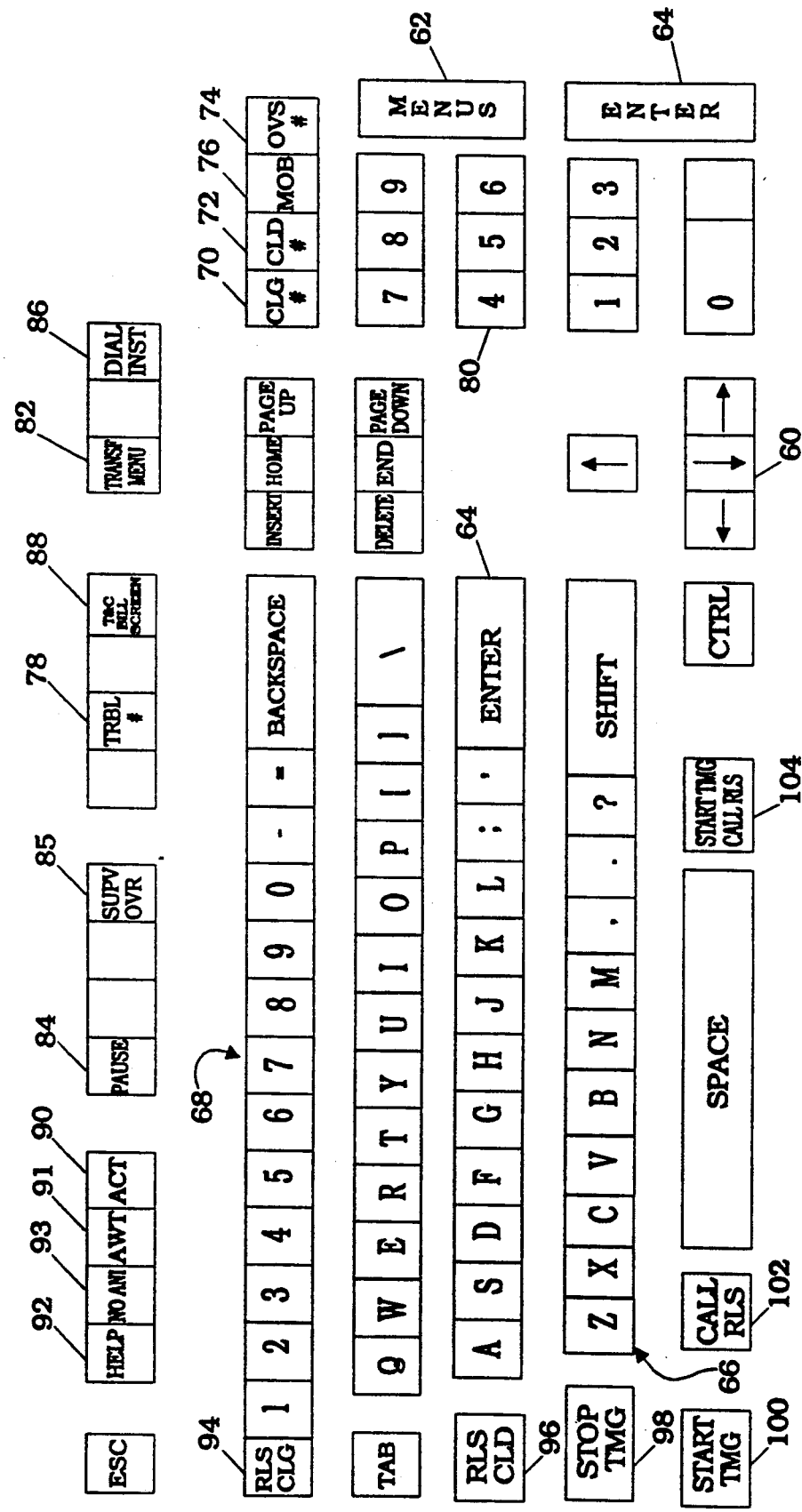
FIG. 2 illustrates a layout and the function of the various keys utilized in the keyboard of the invention.

FIG. 2 illustrates the key layout of the keyboard 44 according to the preferred embodiment of the invention. Various of the keys are standard to terminal or computerized equipment. In addition, numerous keys are programmable to define specialized functions. Certain keyboard keys are especially adapted for selecting menus and moving a cursor with respect to various menu items. The arrow keys 60 allow the operator to move the cursor vertically or horizontally in a standard manner to any position on the screen to select a menu item. Menus themselves are selected by the "MENU" key 62. When a particular menu item has been selected by the operator, there are two "ENTER" keys 64, either of which can be depressed to signal the workstation processor of such selection. In the alternative, certain menu items require data entries to be filled in on the screen by the operator, whereupon the alphabet keys 66 and/or the numeric keys 68 can be utilized, and then the "ENTER" key 64 for signaling the workstation processor of completion of the entry. The "CLG#" key 70, when pressed, is effective to enter the ANI number of the calling party. The "CLD#" key 72, when depressed, is effective to enter the TNI number of the called party. In like manner, when the "OVS#" key 74 is depressed, the overseas called number is entered. The "MOB" key 76 is effective to display method of billing menus on the CRT screen 42. The "TRBL#" key 78 allows the operator to view menus that allow the operator to report troubles with the telephone, telephone lines or service. The numeric keypad 80 can be utilized to enter telephone numbers, or similar numbers for outpulsing by the switching system 12. A keyboard key 82 designated "TRANSF MENU" allows the operator to transfer the call to a multi-lingual, rate or installation operator. A "PAUSE" key 84 is effective to prevent the switch 12 from sending another call to the workstation 18. Certain special conditions may require the use of the "SUPV OVR" key 85 to be used by a supervisor, along with a password, to extend a call to the called party that the software would not allow to be extended. A "DIAL INST" key 86 brings instruction menus on the screen 42 for informing the operator how to accomplish long distance and local dialing for a calling party. The "T&C BILL SCREEN" key 88 is associated with a menu concerning time and charges and billing information. An "ACT" (alternate carrier transfer) key 90 allows the operator to transmit various tones via the switching system 12 to transfer a connection from a calling party to another operator service organization. Importantly, the workstation processor is programmed to be responsive to the "ACT" key 90 only during the presentation of certain menus. The workstation 18 maintains the average work time (AWT) of the operator at that station. By pressing the "AWT" key 91 the operators can view their current average work time. A "HELP" key 92 activation causes the workstation processor to display various instructions and aids to the operator, based upon the menu presently displayed on the screen, or the menu referenced by the cursor position. A "NO ANI" key 93, is used by the operator to select an ANI from the area code/city code table when the telephone equipment did not sent the ANI and there is not a number posted on the telephone that the calling party is using. A "RLS CLG" key 94, when depressed by the operator, is effective to disconnect the calling party. In like manner, the "RLS CLD" key 96 is effective to disconnect the called party. A "STOP-TMG" key 98 is used to cancel any timing associated with this call to prevent billing of any charges. A "START TMG" key 100 is effective to start the time duration of a telephone conversation so that such information can be subsequently transferred to a local central office to complete the billing charges for a long distance telephone call. The keyboard 44 further includes a "CALL RLS" key 102 to release the respective operator workstation 18 so that the workstation is no longer involved in the current call assistance. The depression of the "CALL RLS" key 102 signals the switching system 12 that the associated workstation 18 is idle and ready to receive another incoming call. A "START TMG CALL RLS" key 104 signals the switching system 12 to both release the position and to start timing of the long distance telephone call being processed.

As noted above, the processor of each workstation 18 is programmed to be responsive to the various keys. When the menu-related keys, such as keys 62, 76, 78, 82, and 86 are depressed, the workstation processor is interrupted and proceeds to a routine associated with the depressed key to carry out the function. For example, when the "TBL#" key 78 is depressed, the workstation processor accesses a software routine which quickly displays a menu (FIG. 7c) enumerating the common troubles encountered with telephones, lines, audio levels, coin phone problems, etc. From the main trouble menu displayed in response to the key depression, the operator can select further subsidiary menus to record the problem of the calling party. Further, the software routine can accept inputs from the operator via the keyboard 44, which data is used by the routine for automatic dialing, recording data, etc. For example, if a menu is selected by the operator, such as an emergency number of an ambulance (FIG. 4j), the operator can simply align the cursor with the menu item, depress the "ENTER" key 64, whereupon the telephone number stored in the data base, or associated therewith, will be retrieved by the workstation processor and automatically outpulsed. The operator does not have to manually outpulse such number.

Figure 3:
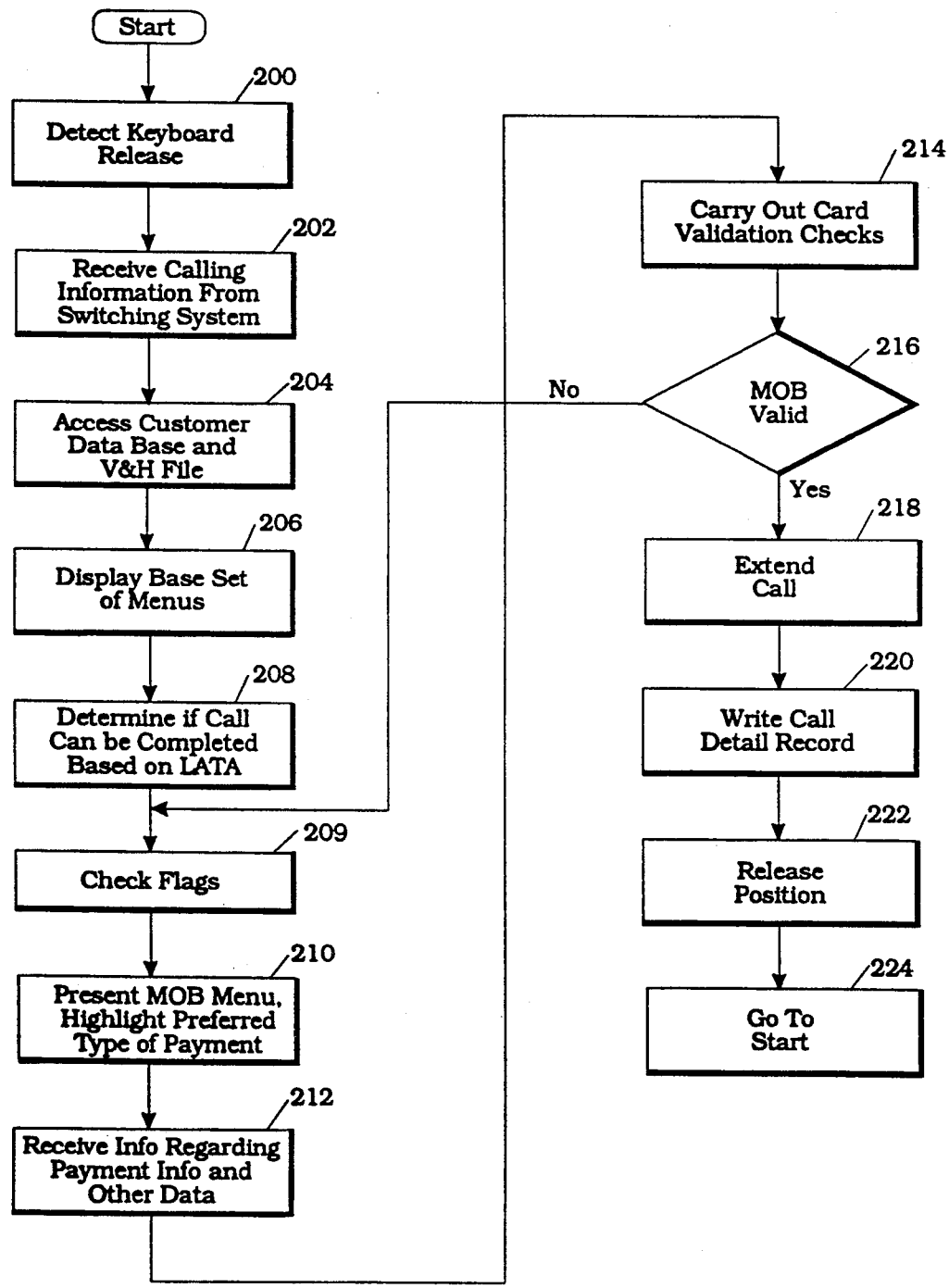
FIG. 3 illustrates a flow chart of the basic programmed operations of an operator workstation.

FIG. 3 is a flow chart illustrating the programmed operations carried out by the processor in the operator workstation 18 to respond to an incoming call and provide operator assistance. In the preferred embodiment of the invention, each workstation is programmed using the 'C' computer language, and using a windows software package "Viewports", obtainable from Bonk Software, Carrollton, Tex. In response to the detection of the keyboard "CALL RLS" key 102, the workstation 18 becomes receptive to incoming calls requiring assistance. This function is shown in program block 200. The workstation 18 then receives incoming calls and calling information from the switching system 12, such information containing the trunk group on which the incoming call was received, the class type of call, the ANI and TNI numbers, as noted in program flow block 202. Importantly, the switching system 12 also forwards calling party release signals and called party release signals to the workstation so that premature call release by the operator is not possible. With such information, the workstation 18 accesses the mainframe computer 24 via the network 22. The mainframe computer 24 accesses the customer data base 26 by cross-referencing the ANI number to a particular file. This function is shown as block 204. Since each smart-type telephone registered with the operator service system 10 is unique, because of its unique ANI number, substantial information particular to each such telephone is preprogrammed into the customer data base 26. A typical record layout for the various data base files 26 and 28 are illustrated in the table appended hereto. Table 1 defines the records in the V&H file 28 for each telephone number (NPA-NXX) in the United States. Specifically, the records of Table 1 specify the telephone location, installation information and billing arrangements.

A record is developed with respect to each such registered telephone. The record includes the NPA-NXX record which identifies the area code (NPA) and the exchange number (NXX) associated with the telephone. In addition, the time zone of the geographical area is noted, as well as the city and state in which the telephone is located.

Vertical and horizontal coordinates in terms of latitude and longitude of the geographical area associated with each registered telephone are stored in the V&H data base 28. As noted above, a particular LATA is identified, and the LATA-sub-zone information. Valid geographical area codes (LATA-sub-zone) records are also maintained in the data base 28 with respect to each registered telephone. A data base record layout also includes non-dialable telephone numbers, international direct dial number indicators, the type of long distance carrier associated with the telephone, daylight saving time information, coin check and bill to regional area office (RAO) information. The local operating company is identified with respect to line charges, toll charges, rates, the credit card validation service to access with respect to the particular telephone, the company code, whether or not equal access is available, and the inter-exchange carrier (IXC) involved.

As noted above, the mainframe computer 24 accesses the customer data base 26 to determine information particular to the telephone set utilized by the calling party. A file for each telephone set registered with the operator services system 10 is stored in the data base 26. Set forth in Table 2 are the various records in the file of data base 26 for each telephone set. Table 3 is a data base entitled PHONE.DAT and illustrates the stored information related to fraud and validation information. Table 4 is a call detail record (CDR) 50, data file of each telephone call processed by the operator services organization 10 to be used by the billing process. Table 6 illustrates the respective records of a country code data base, an area code data base and a trouble code data base.

The operator workstation 18 is programmed to access the various data bases to obtain the information necessary to assist the operator and to display the menus shown in FIGS. 4a-4m. The base screen of FIG. 4a includes a calling party menu 400, a called party menu 402, a billing method menu 404 and an operator message center menu 406. Preferably, the base menus remain on the screen throughout the service period for each incoming call, but such menus can be overlaid with other windowed information that is either necessary to complete the call, or solely for the operator's assistance and convenience. Each base menu includes an outline within which information can be displayed in association with the respective menu. In addition, each menu is color coded so that the operator can gain an association with respect to the colors and the functions of the menu. For example, the calling party menu 400 is displayed in a green color, the called party menu 402 is displayed in a blue color, the billing method menu 404 is displayed in a red color, and the operator message menu 406 is displayed in a magenta color. The background surrounding each menu is the displayed in black. The outline or border for each menu, as well as the text, is displayed in a white color. The keys associated with the various menus are also colored accordingly. Each menu contains valuable detailed information on almost every phase of the call.

With respect to the calling party menu 400, the outline thereof is broken in three places to insert information that is, or may be, essential to the operator's servicing of the incoming call displaying specific details related to the phone the calling party is using. In the upper left corner of the outline of the calling party menu 400 is the text "Calling From (CLG)" which identifies such menu as the calling party menu. The other base menus 402-406 are identified in a similar manner with the function of the menu. In the upper right hand corner of the calling party menu 400 there is automatically displayed numerical text that indicates the time elapsed since the operator received the particular incoming call. The calling party menu 400 has displayed within the bottom right hand portion of the border the local time of the geographical area of the calling party. Since the data base 26 contains information defining the city and state where the calling telephone is located, the local time at such location can be determined and displayed. In like manner, the called party menu 402 has displayed in the bottom right portion of the menu border the local time of the called or destination party. Such time information is obtained from the V&H file 28 using the TNI number dialed by the calling party. With respect to the billing method menu 404, the local time of the geographical area where the party or business entity to be billed is located is displayed at the bottom right portion of the menu border. In like manner, the operator message menu 406 displays the local time where the operator services system 10 is located. In the example, the system 10 is located in the Dallas, Tex. The times displayed are computed by the workstation 18 as actual times and need not be reevaluated by the operator because of daylight saving time, time zone, or otherwise. In practice, the operator workstation 18 includes a real time clock, based on the local time. Various of the data bases include the time zones and whether or not daylight saving time is in effect. Thus, by using the local time, and subtracting or adding hours, the various times of the base menus can be calculated and displayed. Therefore, the operator has visually available the times so that upon inquiry, such information can be communicated instantly and directly to a calling or called party. As will be described in further detail below, the local time for any city in the world can be made available to the operator to answer inquiries from the calling party.

Referring again to the menu 400, there is displayed within the menu border in a blue color the type of telephone from which the calling party is calling, namely, an IXC phone. This information is automatically retrieved by the workstation 18 from the customer data base 26 using the ANI number as a cross reference, and the Area Code and directory number of the calling party. As used herein, the area code 214 is designated as an NPA number, while the exchange 902 is the NXX number. Again, this information is derived from the customer data base 26, and is identical to the ANI number. The telephone from which the calling party is calling is shown on the screen to be an ITI Test Phone located at the address of 9999 W. Technology Blvd., Dallas, Tex. 75220. With this information automatically displayed, the operator knows substantial information about the calling party, all without having to manually or purposefully retrieve any of the information from a data base, card catalogs, indexes or the like.

Because of the limitations of the extent of data that is actually stored in the data base 26 of the mainframe computer 24, the called party menu 402 includes less information, albeit very important information. This called party menu 402 displays specific information regarding the phone number which the calling party requests to call. This includes the TNI number, namely, the 10-digit telephone number input by the calling party. This number is cross-referenced in the V&H file 28, which file includes all of the telephone numbers in the United States. Such cross-referencing allows the computer 24 to determine that the destination telephone is located in Dallas, Tex., as displayed in the called party menu 402.

The method of billing window 404 displays details related to the method of billing. The information displayed after the text "Billing Type" will indicate the billing number. For example, if the billing type is a phone card, then the billing number will be the 14 digit phone card number to be billed. If the billing type is a major credit card, then the billing number will be the major credit card number to be billed. If the method of billing is a phone card, then the city and state corresponding to the NPA and NXX of the phone card will be displayed. On the display line directly beneath the city/state display is a rectangular box that contains the branding information that corresponds to the ANI of the calling number. In this case, ITI (International Telechange, Inc.) is indicated as the business entity branded. Also displayed in a blue color in the billing menu 404 is the text "Verification:". Such information is filled in at the appropriate time if the long distance telephone call is to be completed. Further, if the selected method of billing is valid, the text "Number Is Valid" is displayed continuously in a green color adjacent the "Verification" text. On the other hand, if the billing method is invalid, the text "Number Is Invalid" is displayed in a blinking manner in a red color.

The operator message menu 406 in particular contains not only pertinent call handling information, but in addition, special messages for the operator. Such an area is designated in FIG. 4a as two script lines. For example, since the call is branded for ITI, the prompt text within the message area may be "This is an ITI operator, how may I help you?" If the call was from a telephone associated with XYZ service organization, then the display would indicate such branding and the operator would represent themself as an "XYZ" operator. Various other textual prompts may be utilized in the message area of the menu 406. In the upper right hand corner of the operator message menu 406 there is the displayed text "Primary", meaning this workstation 18 is connected to the LAN on its primary path. In lieu thereof, the word "Secondary" may be displayed to indicate this workstation is connected to the LAN by an alternate path. The word "Back-up" means this workstation is no longer connected to the LAN by any path. The workstation 18 can continue to place calls and no service is lost in the Back-up mode, however, the operator will no longer have available some information about the location of the phone or the branding. In the Back-up mode, the operator has alternate procedures to process the calls in the efficient and timely manner, and will brand all calls as "ITI". Lastly, the word "Reconnect" can also be displayed to indicate the workstation 18 is in the process of reconnecting to the LAN on its primary connection. In the lower left corner of the operator message menu 406, the text "Call Waiting" and "Inactive" are displayed, the word "Inactive" flashing when the operator position is not available to receive calls. Displayed in the menu 406 at the bottom portion thereof is the word "Transfer" and additionally when required other descriptive messages can be displayed, such as "ROBOT", "FREN", "RATE" or "INST" to indicate the transfer process. The words "Timing Started" are also displayed in the menu 406 to indicate that timing of the long distance call has already commenced. In addition, "Email" and "Test Mode" indicators are displayed. Lastly, the flashing text "CLG-INCOMPLETE" is displayed to indicate to the operator that information needed in the CLG window area is missing. Other flashing text can be displayed in this area, including "CLD-INCOMPLETE" and "MOB-INCOMPLETE", the former indicating the called party information is incomplete, and the latter indicating that the method of billing information is incomplete.

Having described the base menus and information presented to the operator according to program flow block 206, reference is now made back to FIG. 3. Program flow block 208 illustrates the programmed steps of the operator workstation 18 where it is determined if the call can be completed based on the LATA information obtained from the V&H file 28. In other words, the processor in the workstation 18 can determine the origin of the call based upon the ANI number received, and the destination of the call based upon the TNI number received. With all the LATA boundary information stored in the V&H file 28, the workstation processor can determine if the call is an inter-LATA call which can be completed, or if it is an intra-LATA call which cannot be completed. Essentially, the data base stores the LATA of each telephone number, and thus if the calling and called telephones are in the same LATA (i.e., intraLATA) the call cannot be completed by the operator services. If the call cannot be completed based on LATA restrictions, the workstation processor displays the prompts "INTRA/SEE DIAL INSTRUCTIONS" or "INTRA/REDIRECT TO LOC OP". When the prompt "INTRA/SEE DIAL INSTRUCTIONS" appears, the operator will follow the dialing instructions for AT&T. When the prompt "INTRA/REDIRECT TO LOC OP" appears, the operator will follow the dialing instructions for LOC OP. This will insure that the calling party reaches the correct operator who can place their intra-LATA call.

On an affirmative response based on LATA restrictions, program flow proceeds to block 209 where a number of flags are checked to determine what type of billing is required of the proprietor of the calling telephone set. Such flags are noted in Table 6. For the type example, the owner of the calling telephone set, of installed in a jail, may require that only collect type calls be allowed, and no other type of billing is permitted. For a public telephone set, the owner may specify that no major credit cards can be used for payment of the call. For a hotel or motel room telephone, the owner may specify that only the room-installed telephones can charge telephone calls to the room. Many other restrictions can be imposed as flags that are checked by the workstation processor. On entering the telephone in the data base records, the owner will specify all the restrictions. During the flag checking procedure according to program block 209, the processor uses the ANI number as a cross reference to the flags, and then highlights the allowed entries in subsidiary menu 408, and reduces the intensity of the options not allowed. The workstation processor will not accept a billing method that is selected by the operator, but not allowed by the flag data. If the call can be completed based on checking of the noted flags, program flow proceeds to block 210. Here, if the call can be completed based on satisfaction of all requirements, the operator workstation processor displays the screen shown in FIG. 4b. As can be seen from this figure, the method of billing menu 406 is automatically updated to indicate a transfer from the automated voice prompt operator 16, noted at the bottom of the menu as a robot 16, to the workstation 18. In addition, two subsidiary menus have been overlaid on the basic menus, one menu 408 having identified therein the possible methods of payment. The menu 408 can be displayed at any time by the workstation operator by depressing the "MOB" key 76. Another subsidiary menu 410 includes information for the operator to fill in if a phone card type of payment is desired by the calling party. Both overlaid menus 408 and 410 are highlighted with double borders, and have interior background colors of black to distinguish such overlaid menus from the base menus. Importantly, subsidiary menu 408 has the entry "Collect" preselected and automatically highlighted, as it is the method of payment which is most often preferred by calling parties. Hence, when the operator inquires of the calling party the manner in which the call is to be paid for, and if the calling party indicates a collect call, the operator does not have to move the keyboard arrow key 60 to move the cursor and select such entry. Rather, such entry is preselected, whereupon the operator simply hits either "ENTER" key 64 on the keyboard 44. Subsidiary overlay menu 410 shown in FIG. 4c is also automatically displayed as the appropriate menu such as with respect to the illustrated phone card type of payment. If another type of payment is desired, other entries in the menu 408 can be selected by the operator, whereupon other associated menus will be displayed in lieu of menu 410. When the "ENTER" key 64 is depressed, based upon a selection of the phone card entry in subsidiary menu 408, the cursor automatically moves to menu 410, left justified with respect to the blank spaces to be filled in the by the operator concerning the credit card number. Hence, the operator can inquire with the calling party as to the credit card number and enter the appropriate digits by way of the keyboard numerical keys. Also, if the call is to be a person-to-person, the name of the destination party is obtained by the operator from the calling party and entered into the next entry of overlay menu 410. The foregoing steps are illustrated as program blocks 210 and 212 in FIG. 3.

In the event that the calling party desires to pay for the long distance telephone card by way of a major credit card rather than a phone card, and such type of payment is allowed, the operator can move the cursor of overlay menu 408 down to the appropriate entry (Major Credit Card) and depress the "ENTER" key 64. This action causes the processor in the operator workstation 18 to display overlay menu 412 of FIG. 4d which provides the same information as menu 410, except with the extra entry of the expiration date of the major credit card. When consulting with the calling party, the operator can obtain such information and fill in the expiration date by way of appropriate keyboard entries.

As noted in the program flow block 214 of FIG. 3, card validation checks are carried out to determine that either the phone card or the major credit card is currently valid. The program steps of this block cause the processor in the operator workstation 18 to address the mainframe computer 24 to obtain such information. Each such request by an operator workstation is accompanied with data identifying the workstation so that when the answer is received, the mainframe computer 24 can direct the same back to the inquiring workstation. In the preferred form of the invention, the mainframe computer 24 accesses the credit card verification services by dedicated telephone lines 34. It should be realized that credit card verification data bases can be developed, licensed, obtained or otherwise maintained internal to the system 10. Nevertheless, in the preferred form of the invention, the mainframe computer 24 transfers credit card number information to external services and obtains an affirmative or negative verification answer. If the response is negative, as indicated in block 216, such information is displayed on the screen of the operator, who then informs the calling party of the invalid status of the credit card. The calling party can then have the option of entering another credit card number, or obtain payment in another manner. If such option is selected by the calling party, program flow may branch back to program flow block 209 where the flags are again checked with respect to a different method of billing, and the operator can change entries in either overlay program flow block 410 or 412 and conduct another validation check of another credit card. As yet another alternative, the calling party might select another optional form of payment, such as a collect call. The "Collect" entry in overlay menu 408 can be selected in such a situation, whereupon the related overlay menu 416 is displayed. This overlay menu is noted in FIG. 4f. When a collect call is designated by the calling party, and such is selected from overlay menu 408, a new overlay menu 416 is displayed. Here, the cursor is initially located near a blank line which is to be filled in by the operator with the name of the called party obtained from the calling party. When such information is filled in by the operator pursuant to conversations with the calling party, the cursor automatically moves down to a line which is to be filled in by the operator, concerning the called party's telephone number. In addition, if it is to be a person-to-person call, the name of the called party is to be filled in on a third line of overlay menu 416. Validation checks in this instance are carried out by the operator placing a call to the called party via the switching system 12. When the operator telephone call is extended to the called party, and the called party responds, the operator can identify the operator service organization and indicate a pending collect call from the calling party, and if the charges will be accepted. If the called party's answer is in the affirmative, and if charge collection can be carried out as set forth below, the operator depresses the keyboard position RELEASE KEY 104, whereupon timing of the long distance call is commenced and the call is extended, as noted in block 218. Once the release key is depressed, all screen menus collapse and the operator workstation 18 is ready to receive another incoming call and service it to completion. As further noted in FIG. 3, the magnetic disk 50 is written with call detail records appropriate for the call. The workstation 18 is then released (block 222) from the call and the processor proceeds to the start (block 224) to receive a subsequent incoming call that requires operator assistance. FIG. 4e depicts a menu utilized in a situation where the calling party initiates a telephone call located at a hotel or inn. When the workstation processor scans the records of the customer data base 26 for the particular phone from which the call is being placed, it will be noted that the telephone is located in a hotel. Accordingly, the processor automatically highlights the "BTR-IXC" entry in the overlay menu 408. The BTR/IXC designation means bill to room/inter exchange carrier. On depressing the "ENTER" key 64 by the operator, the processor brings up both the subsidiary menu 413 and an associated overlay menu 414. Inter-exchange carriers are those private telephone companies which cannot handle long distance traffic and thus they contract with an operator services company to handle such traffic. Stored in the customer data base 26 is data concerning the type of telephone calls permitted by the hotel to be carried by the respective telephone set. In other words, and as noted in subsidiary menu 414, telephone charges can be charged directly to the IXC, or the room can be billed for all telephone calls to whatever destination, or only international calls, or only domestic calls. Only those options which are allowed by the particular hotel, and thus indicated as such in the data base 26, will be displayed at a normal brightness on the workstation screen, while the other non-allowed entries will be dimmed. Based upon the entries of normal brightness in the subsidiary menu 413 as selected by the operator, the overlay menu 414 is displayed. Such overlay menu 414 prompts the operator to solicit from the calling party information to input into such menu, namely, name, the destination phone number and whether the call is of a person-to-person type. The processor in the operator workstation 18 is thus programmed to automatically provide the operator only with the call restriction selections that are allowed either by the hotel or the owner of the phone. The operator cannot move the cursor to a dimmed entry, and thus cannot force the system 10 to complete a call to a destination not acceptable to the hotel or telephone owner. Again, this avoids fraudulent or incorrect selections which can result in loss of revenue. In addition, it can be appreciated that the automatic preselection of various menu entries enhances the speed with which incoming calls can be serviced.

Figure 4A:
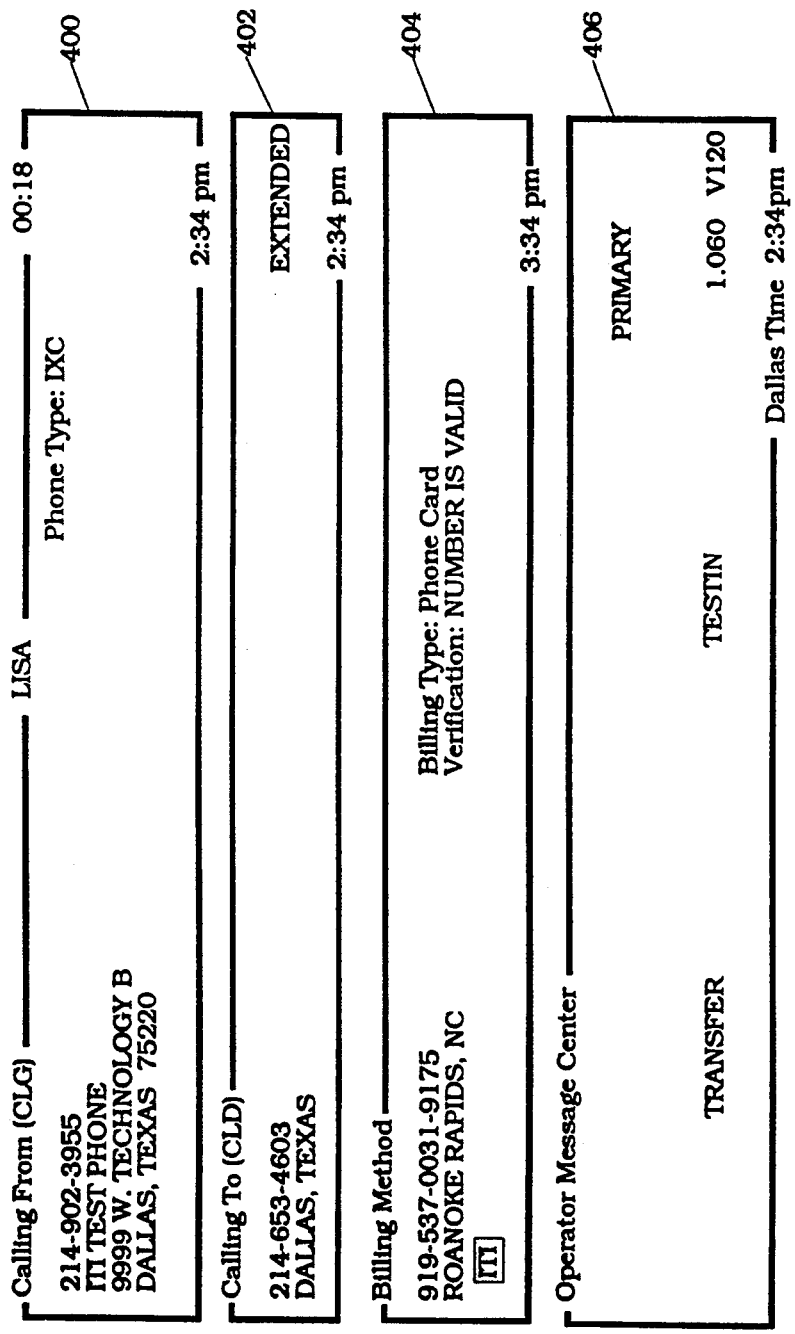
Figure 4B:
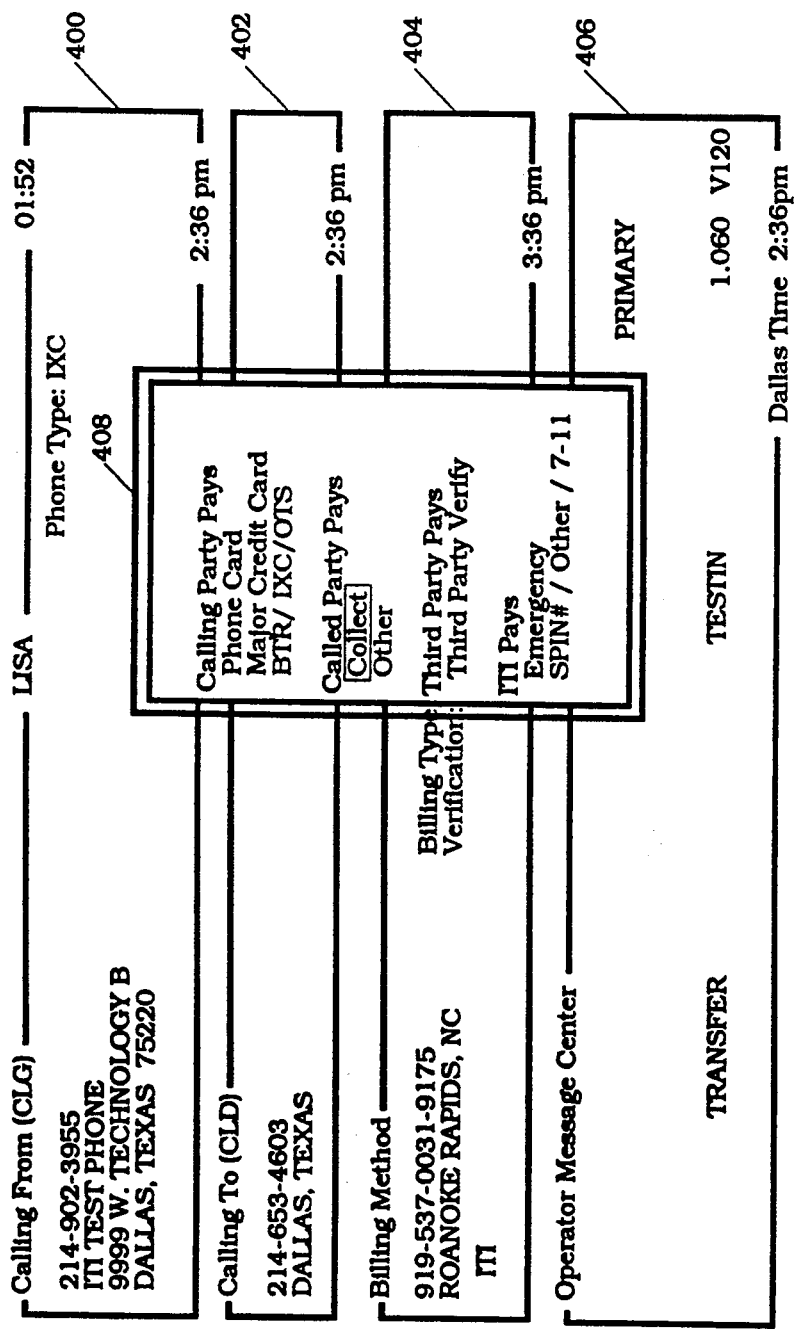
Figure 4C:
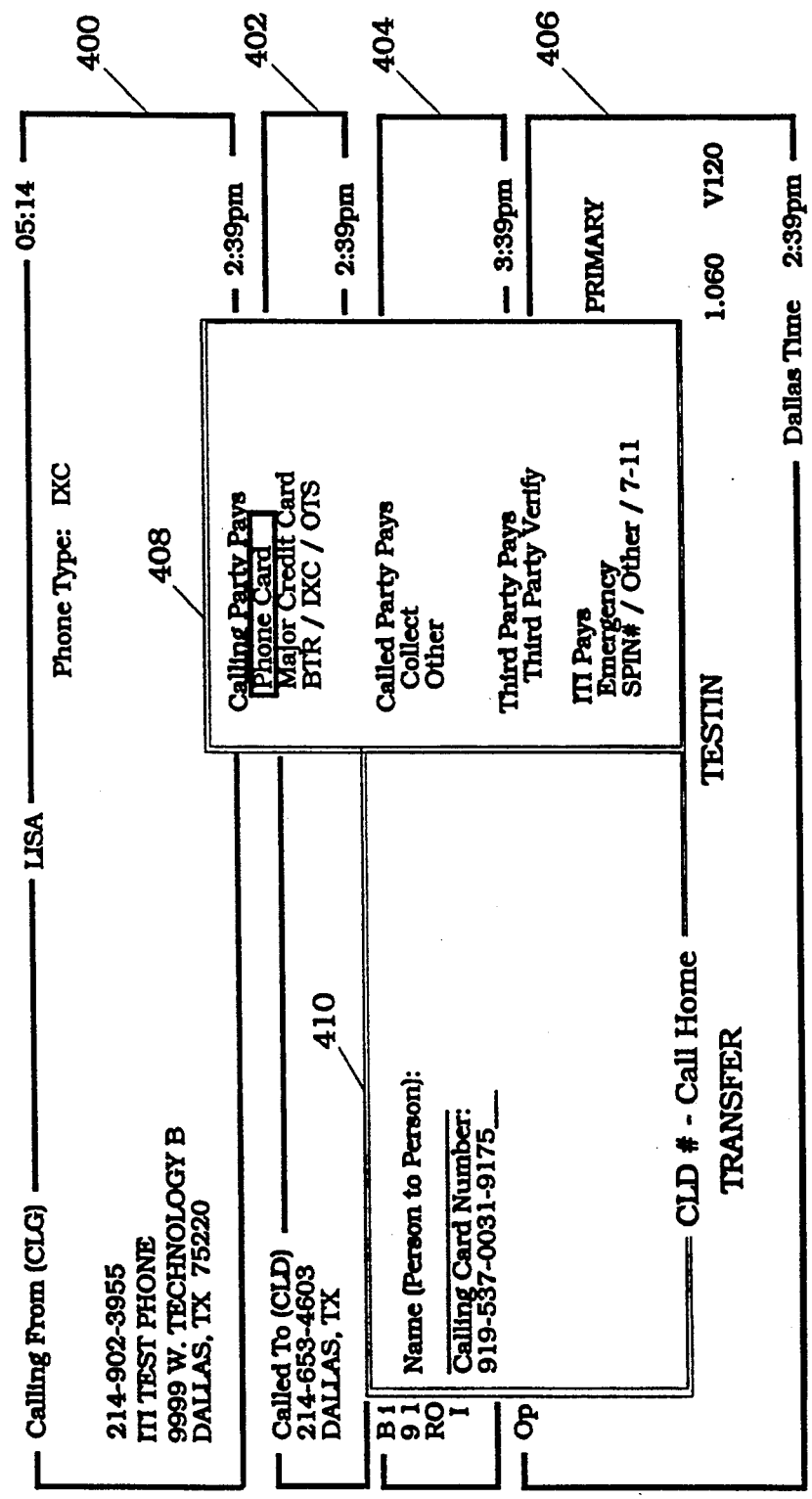
Figure 4D:
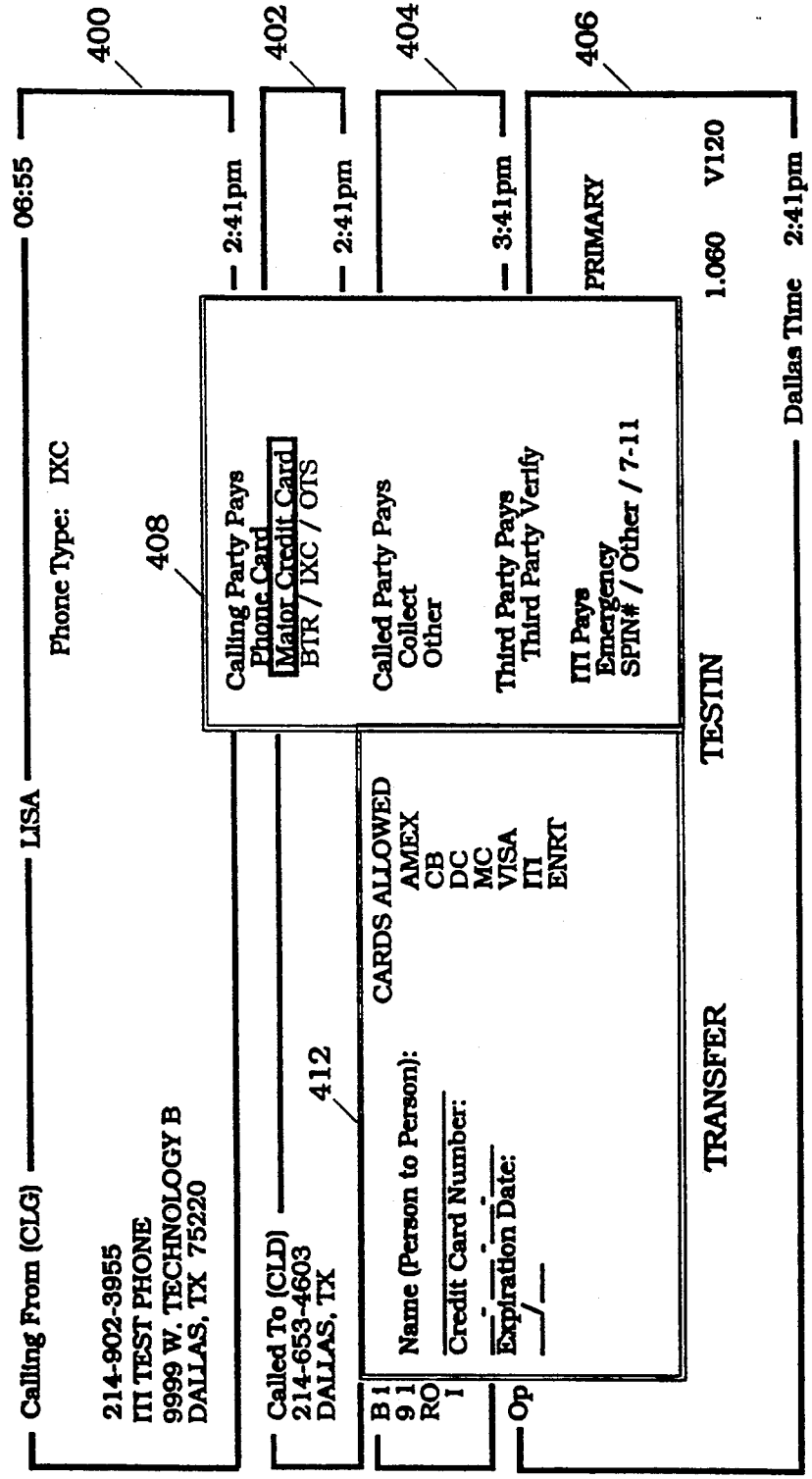
Figure 4E:
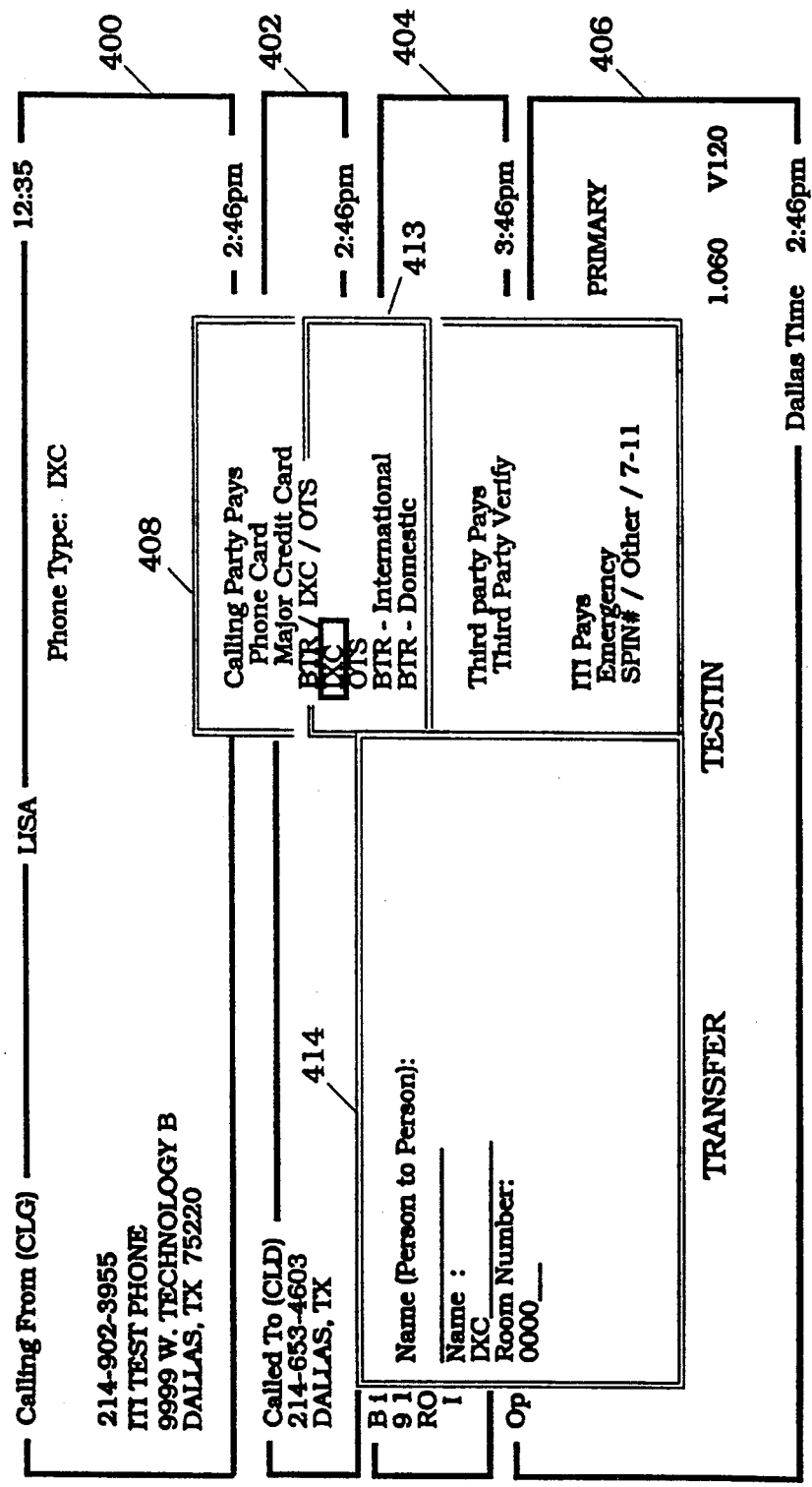
Figure 4F:
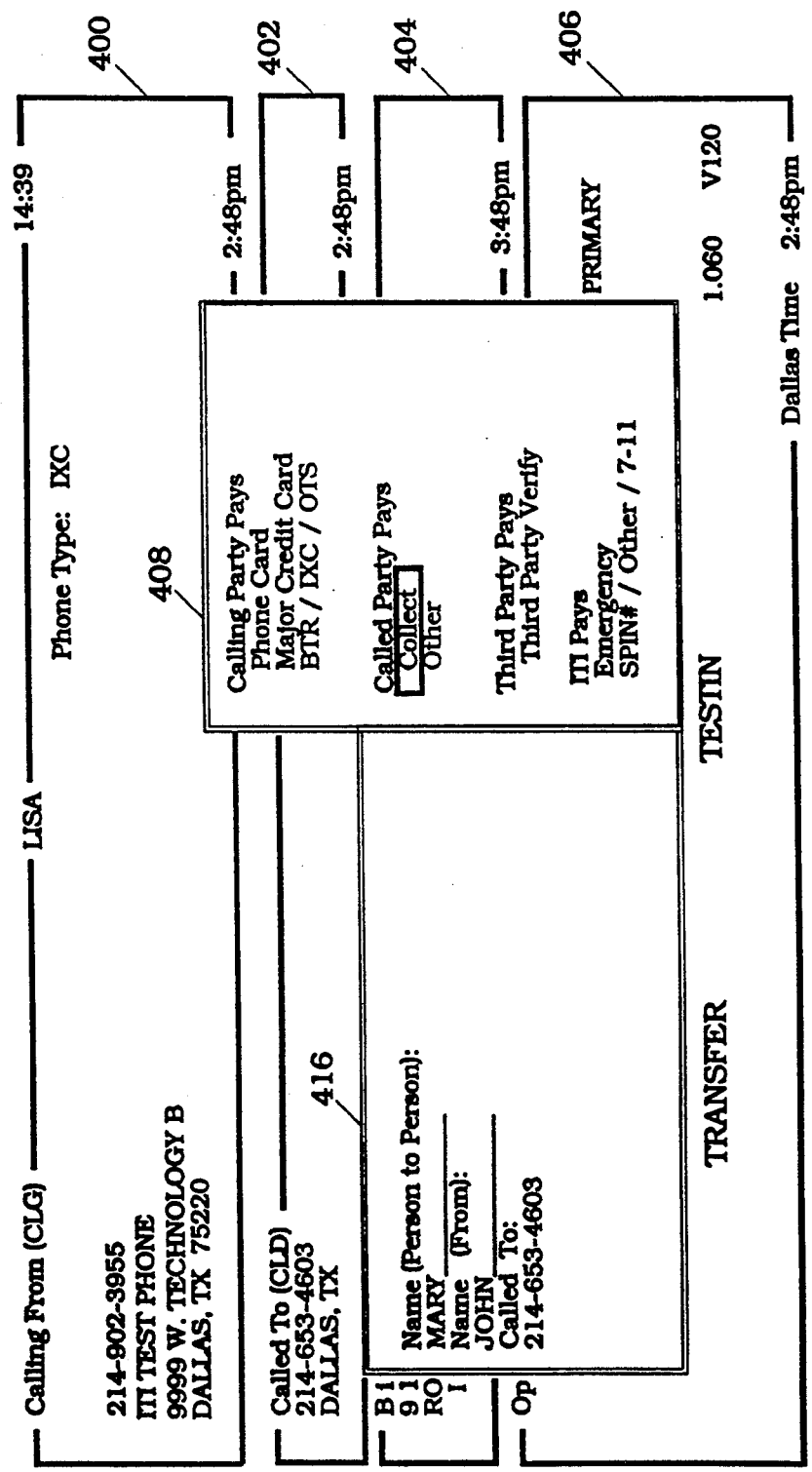

Concurrently with the call processing as noted above, further processing of the call according to the steps shown in FIG. 4f is carried out by the operator workstation processor which is programmed to determine whether or not the called party is serviced by a telephone operating company that has a contractual arrangement with the operator services organization system to collect for the charges and remit the same to the proprietors of the system 10. This information is obtained in the V&H file. In view that there are about 1400 telephone operating companies in the United States, it can be appreciated that there exists some companies who are not willing or able to accept the responsibility of the collection of charges and remittance of the same to other operator services. Accordingly, if such a call cannot be carried out for this reason, a message is displayed on the screen "UNBILLABLE" and the operator informs the calling party accordingly. In addition, in this situation, the operator can depress the "DIAL INST" key 86 and the depressing the "ACT" key 90 to signal the switching system 12 such that standard signalling is carried out to cause the calling party to be connected to a local, or another operator service. However, in the event the telephone operating company in the locale of the called party assumes the responsibility of collection, the processing resumes, such decision being transparent to the operator. Because of this, the system is more fault tolerant, in that erroneous decisions of the operator are reduced, and processing of telephone calls is expedited.

The call processing illustrated in FIG. 4f can be modified, based upon the response of the called party as a result of the collect call. In other words, the called party may accept the charges, but rather than receive them at the more costly collect charges, may prefer to have them charged to a phone card, or a major credit card. The operator can thus select entries in the overlay menu 408 in response thereto, and as illustrated in respective FIGS. 4g and 4f. With regard to FIG. 4g, the operator can select the "Other" entry in the overlay menu 408, whereupon a subsidiary overlay menu 418 is displayed. In this situation, two options are available in the subsidiary menu 418, the phone card method of payment, or the major credit card. In the present example, if the called party desires to pay by way of a phone card, the operator moves the cursor to the appropriate entry in the subsidiary menu 418. The "ENTER" key of the keyboard 44 is then pressed, and the overlay menu 410 (FIG. 4c) is displayed. The cursor is moved appropriately by the workstation processor so that the operator can fill in the calling card number of the called party as well as their personal identification number (PIN). When such information is obtained and entered, card validation procedures can be carried out as described above.

Figure 4G:
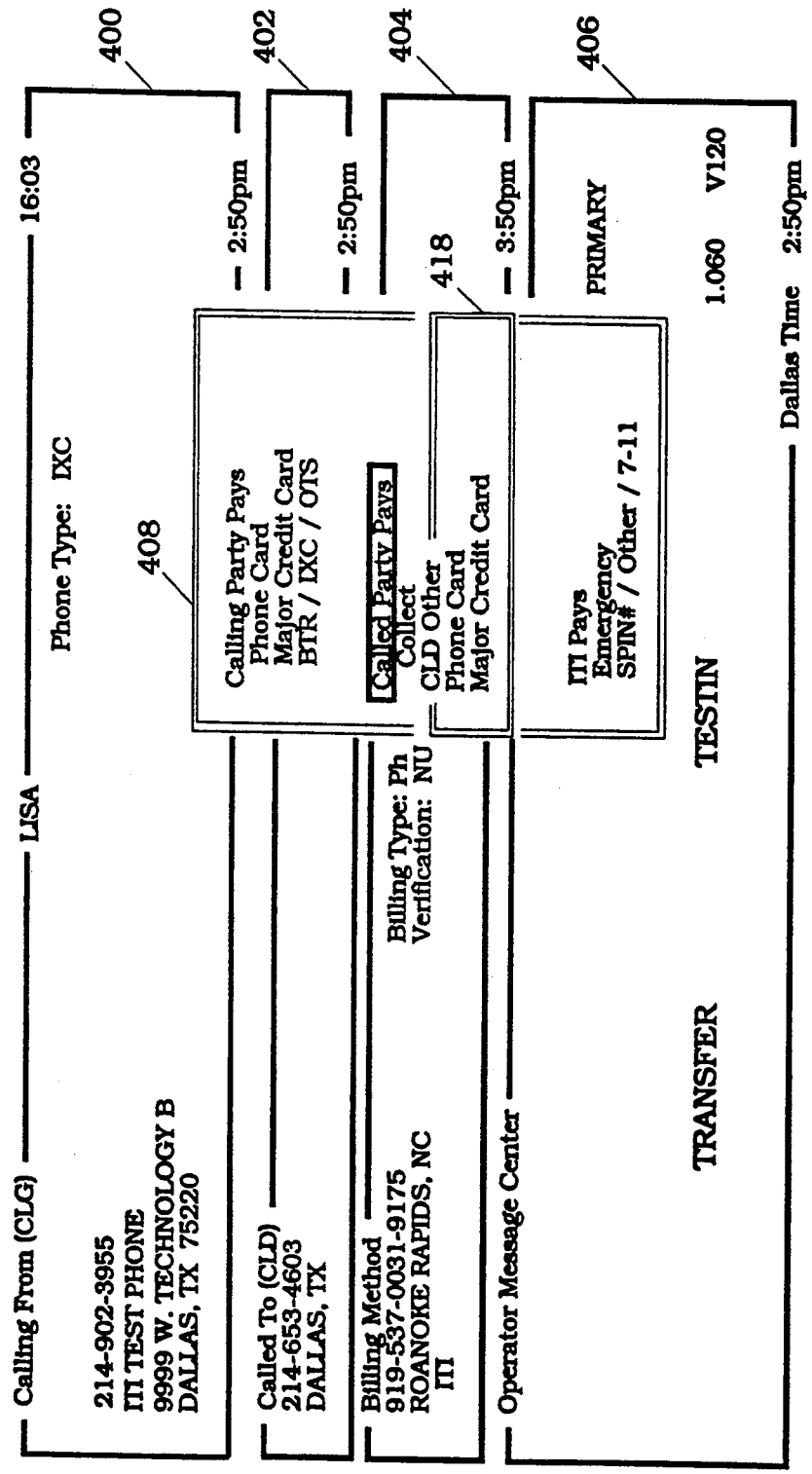

FIG. 4g illustrates the situation in which the called party does not wish to receive collect charges, but rather a lower rate such as when the charges are billed to a major credit card. In this instance, the operator selects the "Major Credit Card" entry in the subsidiary overlay menu 418 and depresses the keyboard "ENTER" key. The overlay menu 412 (FIG. 4d) is then displayed, with information soliciting the entry by the operator of the credit card number, the expiration date and the name of the called person if a person-to-person call is desired. Again, card validation proceeds in the manner described above so that the call is either completed if the card is valid, or not completed if the card is invalid.

Figure 4H:
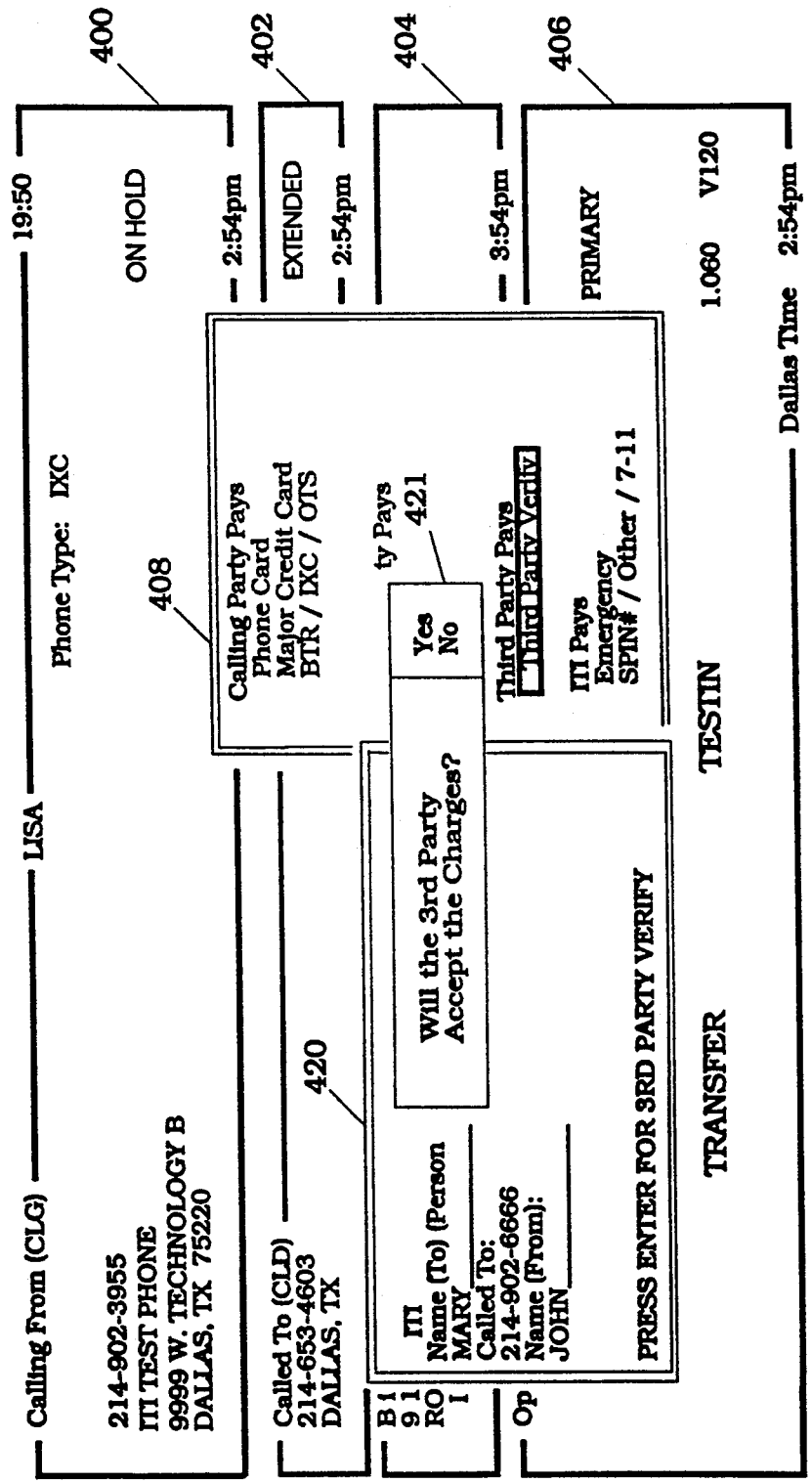

FIG. 4h illustrates yet another situation for assisting the operator in completing a call when the calling party desires to refer the charges to his or her residential telephone. Again in this situation, the workstation processor consults the V&H file 28 to determine if the local telephone company serving the residential phone has an arrangement for remitting payment of the charges to the proprietor of the operator services system 10. In any event, if such an arrangement exists, the workstation processor automatically allows the operator to proceed. After the operator has selected the entry "third party verify" from the overlay menu 408, the overlay menu 420 is displayed. Information within such overlay menu 420 allows the operator to solicit from the calling party the telephone number and name of the third party, whereupon the operator enters such information by way of the keyboard 44, under cursor control of the menu 420. After such information is entered, the operator follows the prompt at the bottom of overlay menu 420, i.e., press the "ENTER" key for third party verification. When such action is carried out, another subsidiary menu 421 is displayed, such menu having information concerning the affirmative or negative acceptance of the charges by the third party. At this point, the cursor is automatically preset to the position adjacent the "Y", in anticipation of an affirmative response. Concurrently, the operator can cause the outpulsing of the third party telephone number to communicate and determine if the particular named third party is present and if such party will accept the charges. Dialing by the operator workstation is carried out by a modem capable of producing DTMF signaling. On an affirmative response, the operator can simply hit the "ENTER" key to signify the "Y" selection within the subsidiary overlay menu 421. If the third party replies in the negative, the operator can move the cursor down to the "N" designation of menu 421 and hit the "ENTER" key. In the alternative, the operator can hit either alphabet keyboard key "Y" or "N" to enter the respective affirmative or negative responses. On an affirmative response, the operator again depresses the start timing and "START TMG CALL RLS" key 104 to release the operator position and start the timing of the long distance telephone charges.

In accordance with an important feature of the invention, signals passed by the switching system 12 to the operator workstation 18 prevent premature release of the calling party, or the called party before such party has gone on hook. Were this to happen, dial tone could be returned to the calling or called party, whereupon such party could initiate another call without incurring charges. To prevent this situation and thus remove such a decision from the operator, the workstation is programmed to transmit a call release signal to the switching system 12 only after the workstation has detected a called party hang-up signal and/or a calling party hang-up signal from the switching system 12. In other words, irrespective of when the operator depresses the "START TMG CALL RLS" key 104, the workstation 18 will not transfer such indication until after the appropriate hang-up signal has been received from the switching system 12. With this feature, the call procedure is controlled by the workstation 18 so that calling fraud is minimized and taken out of the subjective decision of the operator.

Figure 4I:
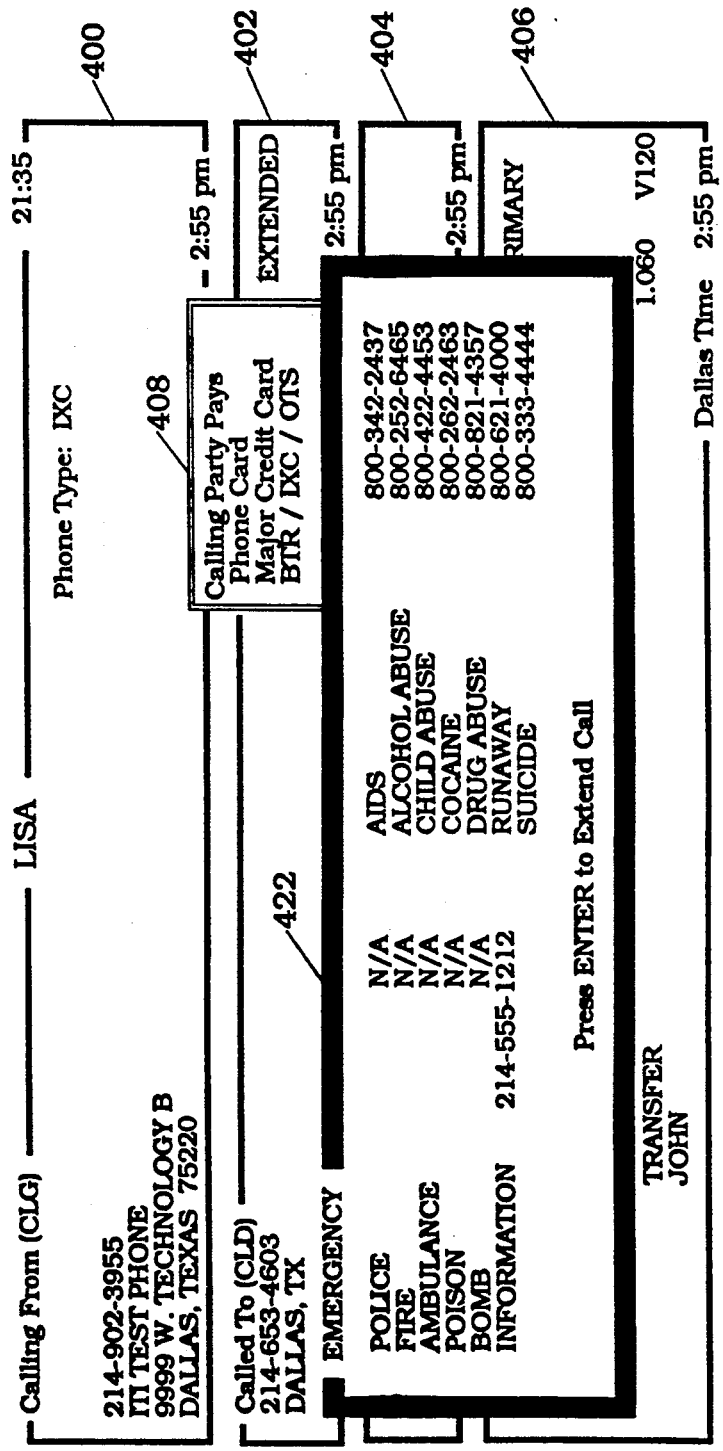
Figure 4J:
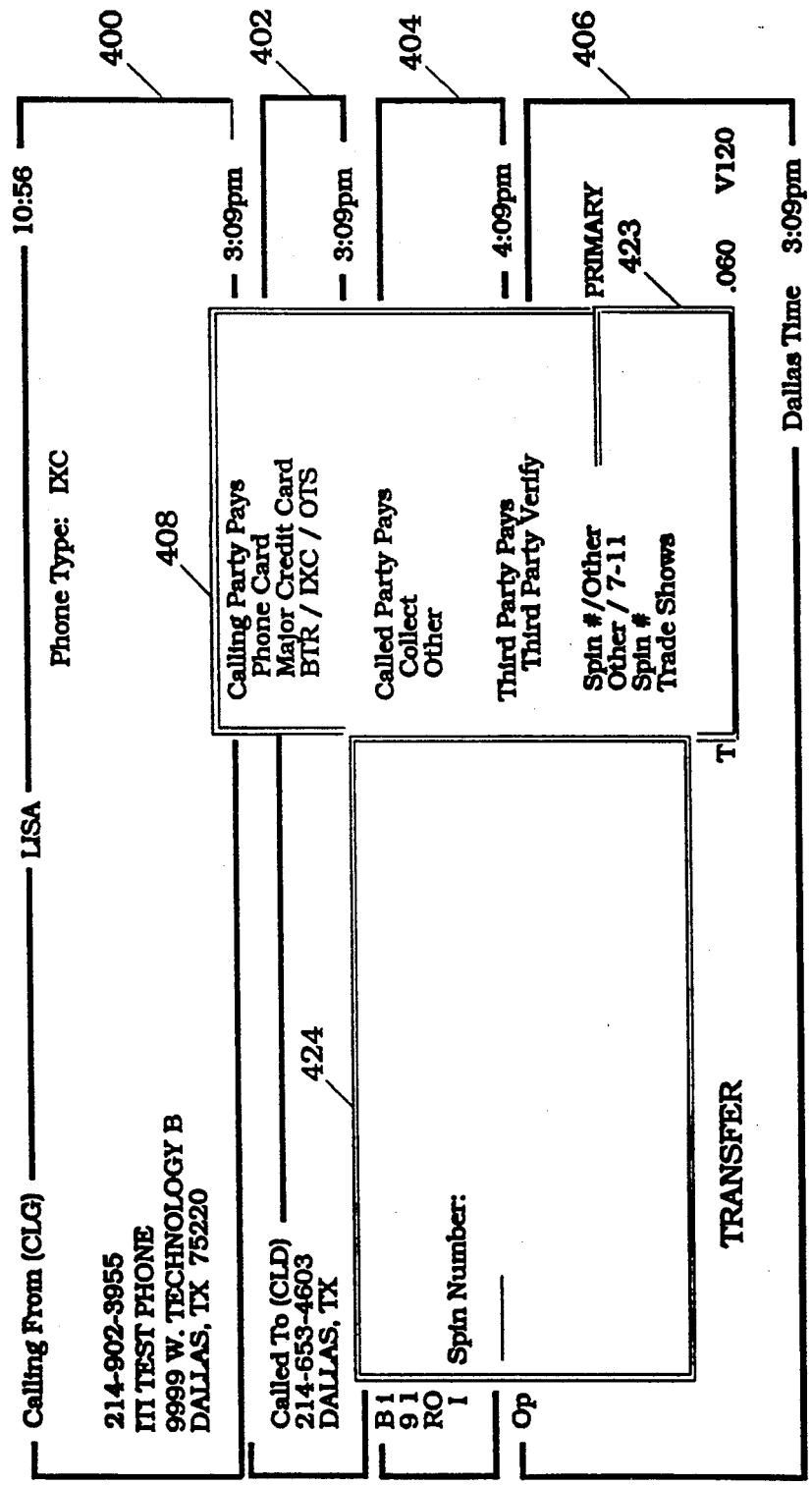
Figure 41:
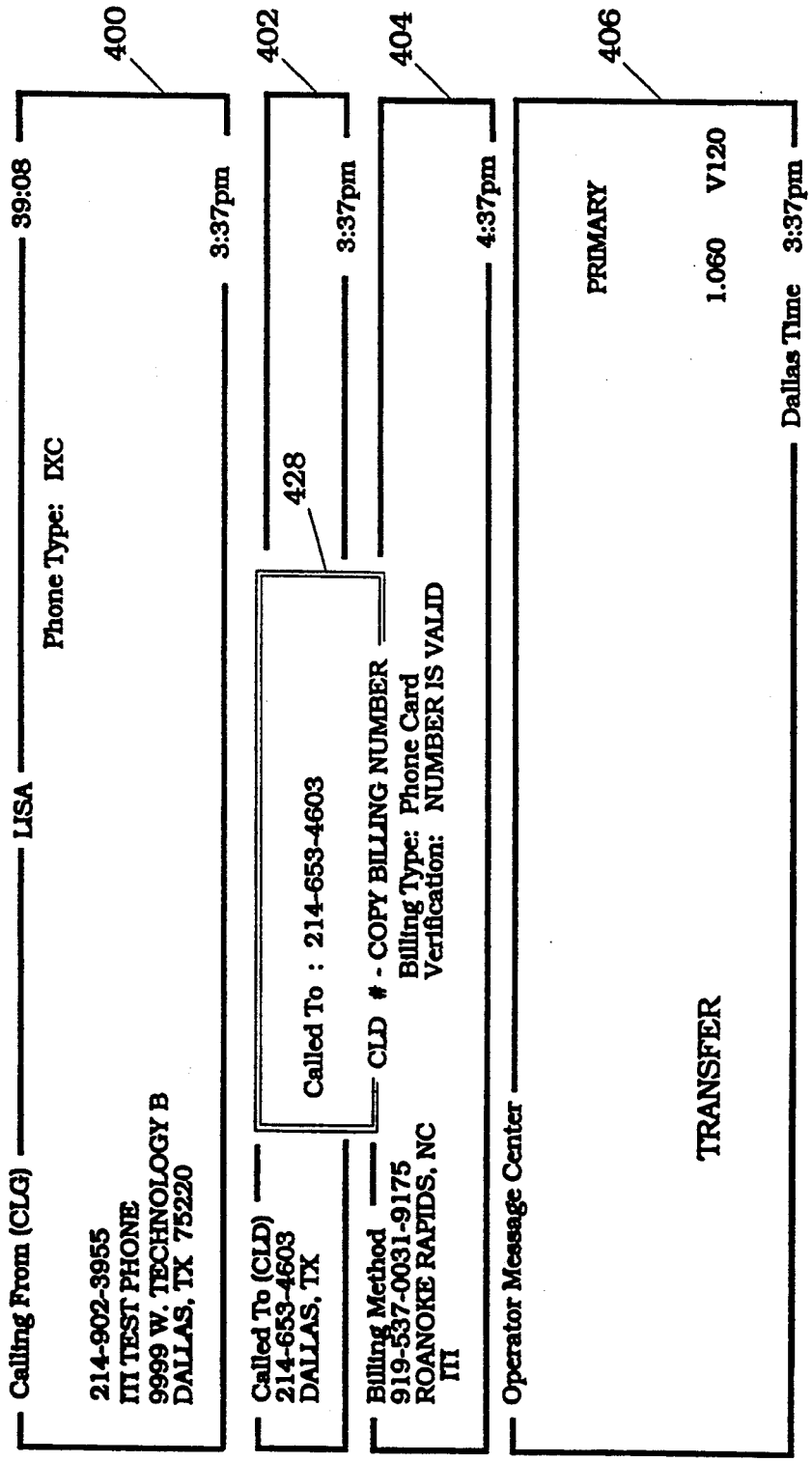

In FIG. 4j, there is illustrated a method of billing menu selection corresponding to the entry "SPIN#/OTHER." This is a specialized menu entry that can be selected to allow only certain persons to complete telephone calls from any telephone set registered with the operator services system 10. For example, an arrangement has been made with the New York City Police Department to allow policemen to use any registered telephone set to place a call, free of charge, to the nearest police precinct station. To accomplish this, each policeman is assigned a unique special personal identification number (SPIN). When a policeman initiates a call, the call is automatically forwarded to the operator services system 10, and the operator learns that the policeman wishes to complete a call to the precinct station. The operator thus selects the entry highlighted in the overlay menu 408. Such selection results in the display of auxiliary menu 423 partially overlying menu 408, and the operator selects the "SPIN#" entry which causes the processor to display the overlay menu 424. Here, the operator solicits from the police officer the special personal identification number for entry into such table by way of the numeric keys on the keyboard 44. When entered, and if matched in the data base with a prestored SPIN, the call is completed. The call is completed by information stored in the ANI.DAT portion of the V&H file 28 which has a correlation between the ANI number of the telephone used by the policeman, and the nearest precinct. The telephone number of the nearest precinct associated with the ANI number is then outpulsed by the system 10 without further effort by the operator. The efficiency of the system 10 is thus apparent.

Other free calls undertaken by the proprietor of the operator services system 10 is shown in FIG. 4i. This set of menus is particularly useful when the calling party is involved in an emergency situation. A calling party may simply dial the operator, or other combination of digits for reaching the operator services system 10. The operator is generally informed of the emergency situation, whereupon the "emergency" entry in the overlay menu 408 is selected by the operator. Since the operator may be hundreds or thousands of miles removed from the location of the calling party, a larger, overlay menu 422 is displayed on the workstation screen 42, within the base menu set. The text and information displayed within the separate menu 422 relates to different associations and telephone numbers located in the area of the calling party. The information lists those organizations, such as police department, fire department, child abuse organization, poison control, etc., and telephone numbers which may be required in different emergency situations. In addition, such associates are those that are in the nearest proximity of the telephone set used by the calling party. Such information is initially entered into the customer data base 26 when the telephone set is registered with the system 10. When registering the telephone set, the owner is required to complete a form which lists all the information noted in the menu 422, and all other information concerning billing information, revenue or commission information, which domestic or international calls or third party calls or collect calls are allowed, which calls are to be blocked, etc. In any event, the separate menu 422 is displayed for use by the operator in placing the calling party in communication with the relevant organization. This can be extremely useful, in that the calling party may have no idea what organizations are even available, the corresponding address or telephone numbers. The operator simply proceeds in this situation by directly dialing the telephone number listed in the menu 422 to communicate with the organization. In this instance, a three party conference is established, the operator being in the talking loop until the emergency situation has been resolved. As with the other menu entries described above, the workstation processor is programmed to automatically highlight an entry, such as "Police" which is the most likely to be selected by the operator. If the emergency relates to a situation in which the police can be helpful, then the operator simply hits the keyboard "ENTER" key when the cursor is adjacent the "police" entry. If another entry is pertinent, the operator can tab to such entry, or can type in the letter "B" should the "bomb" entry be desired. Again, the "ENTER" key 64 is depressed to extend the call to the relevant organization. As with the operations described above, the system automatically outpulses the telephone number, without further assistance by the operator. When the call is complete, the operator simply depresses the "START TMG-CALL RLS" key 104 on the keyboard 44 to terminate the three-way conversation. Long distance telephone calls related to emergencies can be charged to predefined entities, but in the preferred form of the invention, such calls are charged to the operator services system 10.

FIG. 4j shows a screen display applicable to yet another situation. This method of billing screen 408 is applicable to instances, such as trade shows, seminars, and the like, where telephones are temporarily installed and available for complimentary use, i.e., free of charge. Often, this serves as a technique to advance public relations or advertisement. A calling party using such a telephone places a routine call by inputting the long distance digit sequence, whereupon the phone call is routed to the operator services system 10. On communicating with the calling party, the operator becomes aware of the type of call and thus selects the "SPIN#/OTHER" entry of the overlay menu 408. A subsidiary menu 423 is then presented on the screen and the operator selects the "Trade Shows" entry. The workstation processor then consults the customer data base 26 to determine the geographical extent to which telephone calls from the telephone can be made. Generally, in such a case, only domestic telephone calls can be completed. To that end, the workstation processor compares the TNI number input by the calling party to determine if the destination is domestic or international. If the TNI number comprises the restrictions previously stored in the data base, the call can be carried out as a free call.

It should also be noted in the overlay menu 408 that there exists and entry "ITI PAYS." When this entry is selected by the operator, no further provisions need be satisfied for billing requirements, as it understood that the proprietor of the operator services system 10 will undertake the cost of the associated telephone calls. The "ITI PAYS" function is carried out only when the identity of the calling telephone matches an identity stored in the data base 26, thereby preventing the operator from allowing changes from other calls to be charged to the system 10. In addition, the mainframe computer 24 maintains a record of each workstation 18 with respect to the dollar amount and the number of times the "ITI PAYS" function is carried out.

FIG. 4k depicts a menu utilized in a situation where the ANI of the calling party's telephone did not arrive at the operator workstation. The overlay menu 426 will be displayed and the operator will ask the calling party for the phone number on the phone that they are currently using. The operator will enter the ANI and the processing will continue with mainframe computer 24 accessing the customer data base 26 and displaying the calling phone information. In the event that the ANI arrived at the workstation, but was not valid as determined by the V&H data base, the operator can access this menu by depressing the "CLG#" key 70.

If the calling party does not enter the TNI of the called party or wishes to place a call to another number, the operator can access the menu 428 as shown in FIG. 4l by depressing the "CLD#" key 72 and entering the TNI using the numeric keys 80.

Figure 4M:
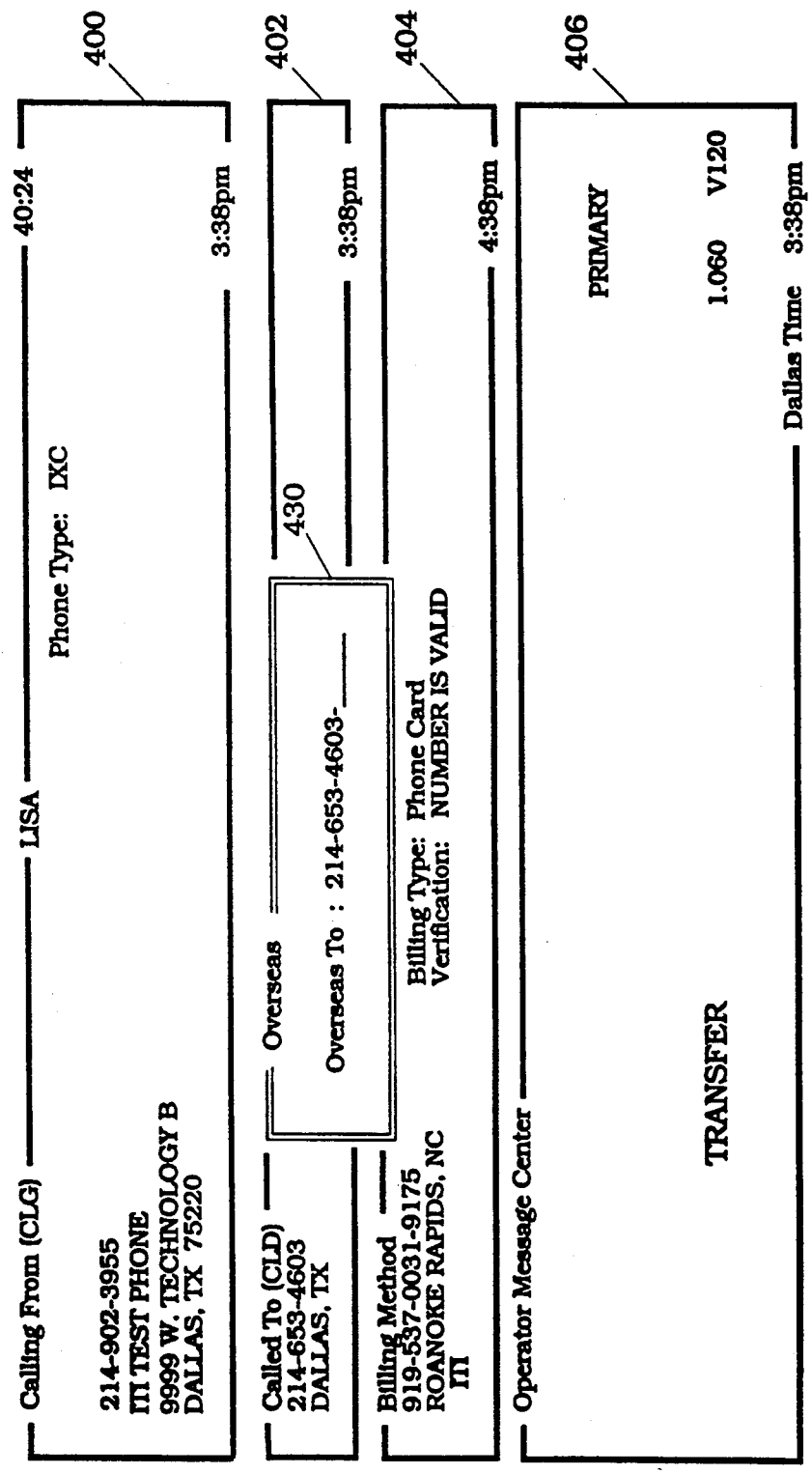

If the calling party wishes to place a call to another country, the operator will access the menu 430 shown in FIG. 4m by depressing the "OVS#" key 74 and then entering the country code, the city code, and the phone number of the called party.

Figure 5A:
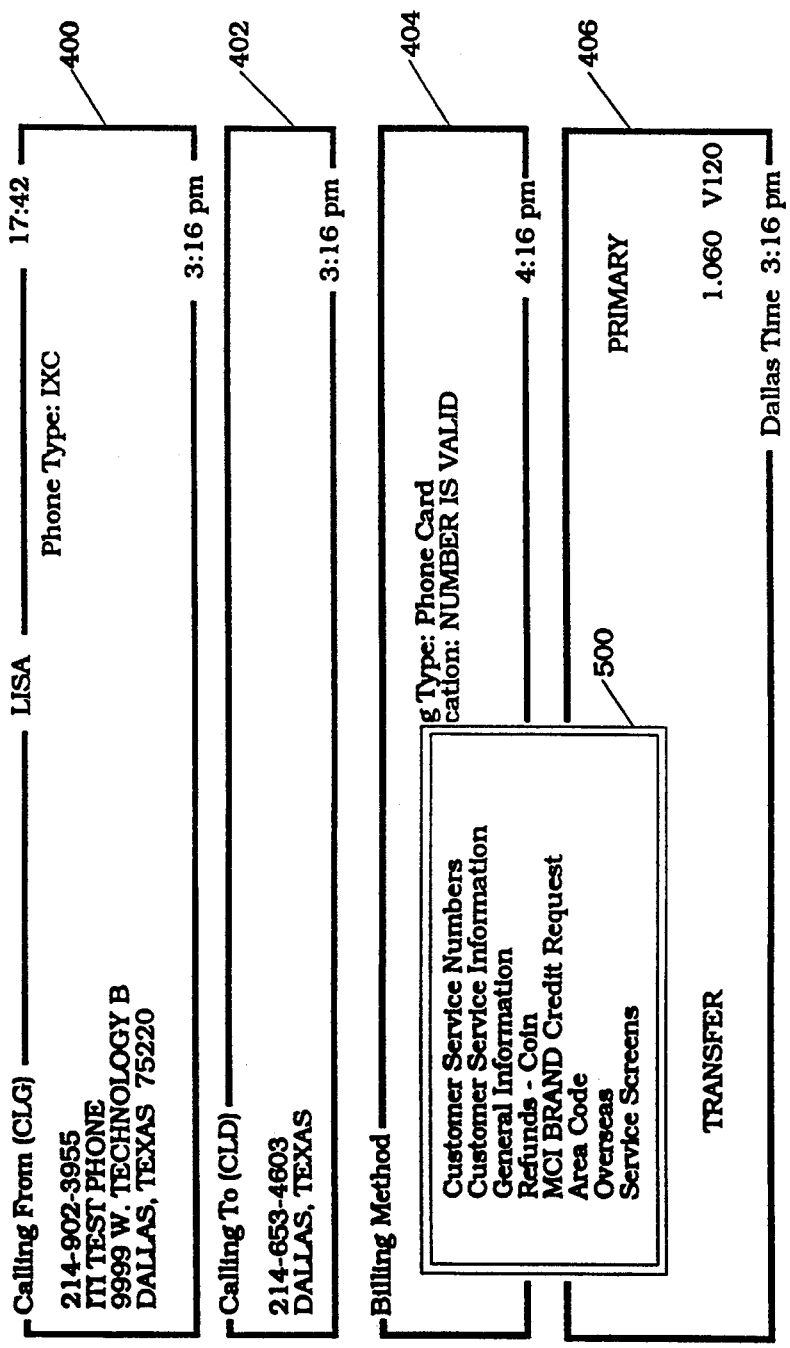
Figure 5B:
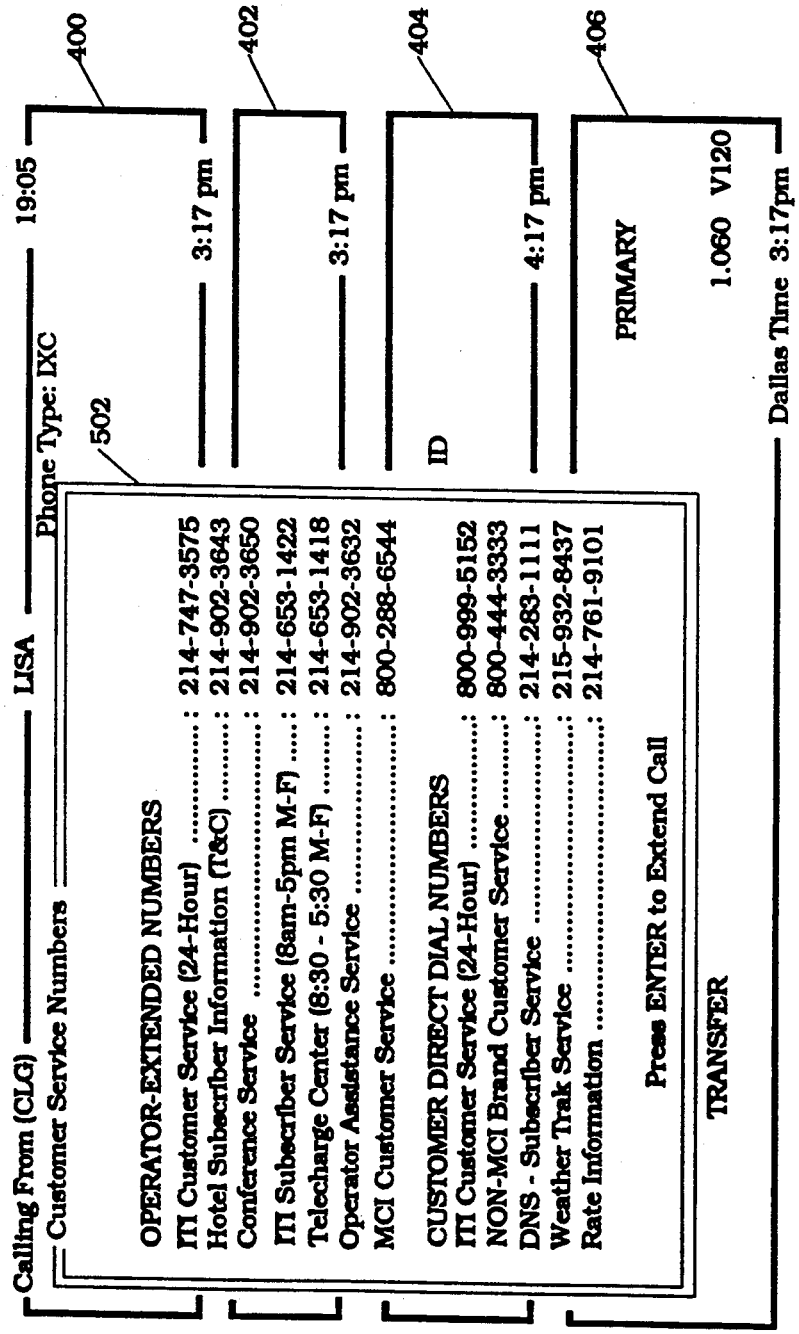

FIG. 5a illustrates a series of available service menus to assist the operator with general and specific information. An overlay menu 500 can be displayed when the operator depresses the "MENU" key 62 on the keyboard 44. The overlay menu 500 lists a number of other menus that can be displayed for helping the operator in particular situations. For example, the first entry identified in overlay menu 500 is "Customer Service Numbers." When such a menu is selected via the cursor and "ENTER" key 64, a related overlay menu 502 of FIG. 5b is displayed. Overlay menu 502 identifies various services that may be available to the customers, and the associated telephone numbers. For example, listed in the overlay menu 502 is the subscriber service department and the hours of operation, operator assistance center, weather information, rate information, etc. If, for example, the calling party requested information concerning calling rates, the last entry in overlay menu 502 can be selected, and the "ENTER" key 64 depressed, whereupon the calling party is automatically transferred to the rate operator by automatic outpulsing of the telephone number noted in the overlay menu 502.

Figure 5C:
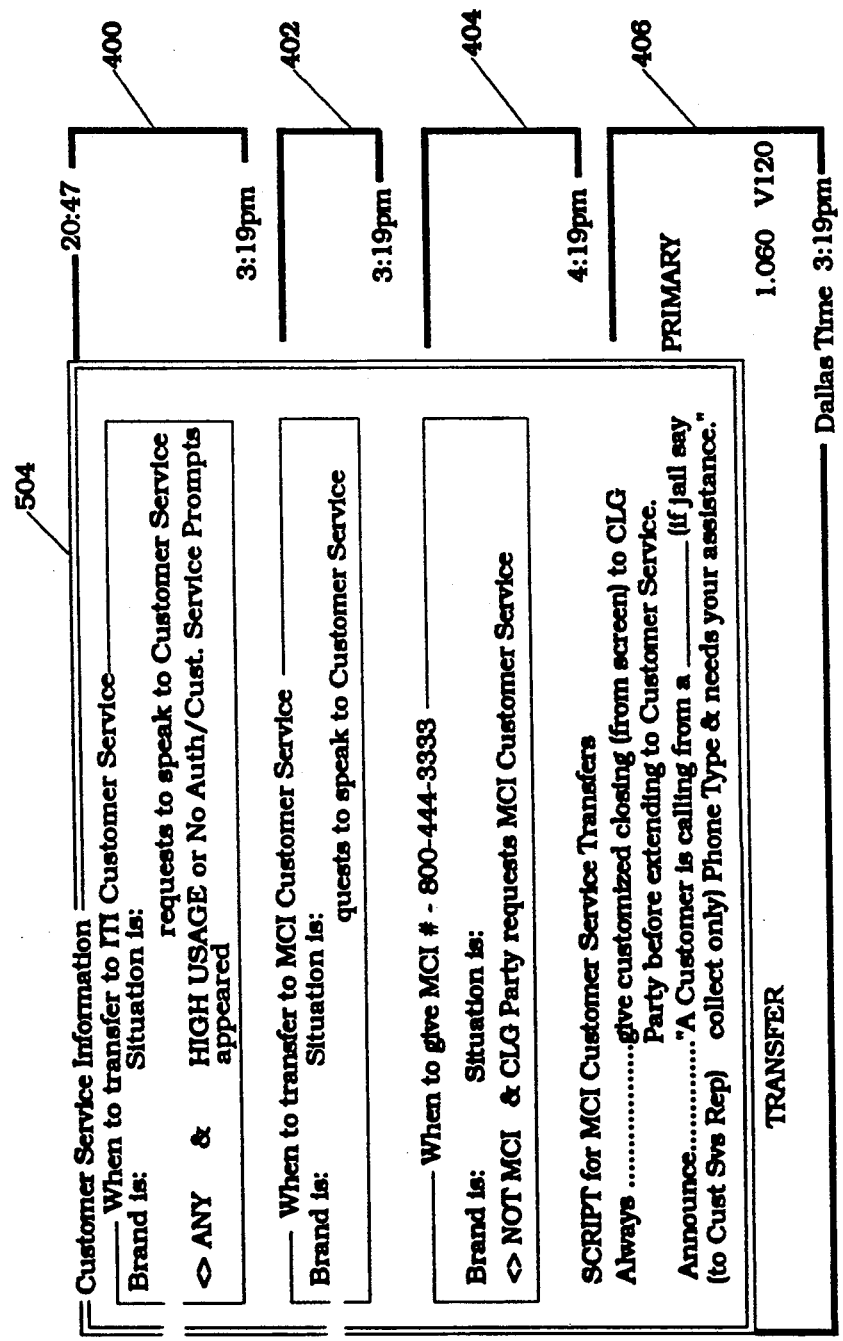

FIG. 5c illustrates the menu displayed when the "Customer Service Information" entry is selected from the overlay menu 500 of FIG. 5a. Menu 504 shows when to transfer to ITI customer service, when to transfer to MCI customer service, when to give MCI # to calling party and script information for the operator when transferring such calls.

FIG. 5d illustrates the overlay menu access screen 506, when the entry "General Information" is selected according to menu 500. This overlay menu 506 is displayed so that the operator can observe the general information identified therein. For example, such menu 506 may include the calendar holidays, various calendars for future years, the mailing address of the operator services entity, etc. Importantly, the general information overlay menu 506 may contain sufficient information that it cannot all be displayed. Hence, the operator can scroll the information up or down in the window of the menu 506 to select the desired information. Scrolling can be carried out by depressing the appropriate arrow associated with keyboard keyset 60.

FIG. 5e illustrates the selection of the menu entry "Refunds-Coins" from the overlay menu 500. As a result, menu 508 is displayed. The menu 508 includes within the border thereof areas for entering information by the operator. For example, there is an area identified for entering the amount of refunds and the name and address of the person to whom the refund is to be sent. Also, there are listed a number of reasons why the calling party is deserving of a refund, such reasons being selectable by the operator for records purposes. Once such information is completed within the menu 508, the operator work station can collect such information and send it to the mainframe computer 24 for processing so that the refund can be carried out. Also, other software routines can be carried out to determine that, based upon a number of refunds requested of a particular telephone, the telephone may be defective and therefore require repair. Repair notices can also be provided by the mainframe computer 24 via printers (not shown).

FIG. 5f illustrates an overly menu 510 displayed when the entry "MCI Brand Credit Request" is selected from the menu 500 of FIG. 5a. The menu 510 includes within the border thereof areas for entering information by the operator specifically for MCI. For example, there is an area identified for entering the method of billing and the type of call the MCI account number to which the credit will be applied and the name and address of the calling party. Also, there are listed a number of reasons why the calling party is deserving of a credit, such reasons being selectable by the operator for records purposes. Once such information is completed within the menu 510, the operator work station can collect such information and send it to the mainframe computer 24 for processing so that MCI can be notified and the credit carried out.

FIG. 5g illustrates a menu 512 when the "Area Codes" entry is selected from menu 500 of FIG. 5a. As a result, a separate large menu 512 is displayed. Menu 512 identifies as an entry therein each state of the United States and the appropriate area codes. As can be appreciated, certain states have a single area code that can be identified adjacent the state. Other states, such as Alabama, include numerous area codes, and thus does not include a single area code entry adjacent thereto. Thus, in order to obtain area code information for the various cities in Alabama, the "Alabama" entry is selected, as shown, such as typing in an "A" on the keyboard 44, or aligning the cursor with the desired state and hitting the "ENTER" key 64. As a result, an overlay menu 514 is displayed with each city in alphabetical order, and the associated area codes. Because all Alabama cities cannot be displayed in the overlay menu 514, the operator can scroll up or down the menu 514 cities to obtain the particular city. In addition, if the area code for Aliceville is desired, the operator can simply type in "A" at the bottom of the menu 514 to quickly transfer to the Alabama cities starting with the letter "A." In any event, the operator can quickly and easily obtain the area code of the particular city and thereby assist the calling party.

Because of the frequency of long distance calls which may be made to countries adjacent the United States, menus for Canada and the Caribbean Islands can be displayed by pressing the "PAGE DOWN" key. Such an instruction is noted at the bottom of the menu 514.

FIG. 5h illustrates menu selections for providing the operator with overseas country and city codes. By selecting the "Overseas" entry in the overlay menu 500, the overseas country code menu 516 of FIG. 5h is displayed. In practice, the menu 516 is displayed as a separate, non-overlay menu which can be scrolled to display all the countries in the world. With respect to the menu 516, there is listed all the countries is the world in alphabetical order, and the associated country codes. As noted, some countries are not associated with country codes, and thus cannot be accessed through the operator services system 10. As a further assistance to the operator in completing international telephone calls, if city codes of a particular country are required, the operator can align the cursor with the desired country and press the "ENTER" key 64. For example, if Argentina is selected, the selection brings up an overlay menu 518 of cities in Argentina and the associated city codes.

Figure 6A:
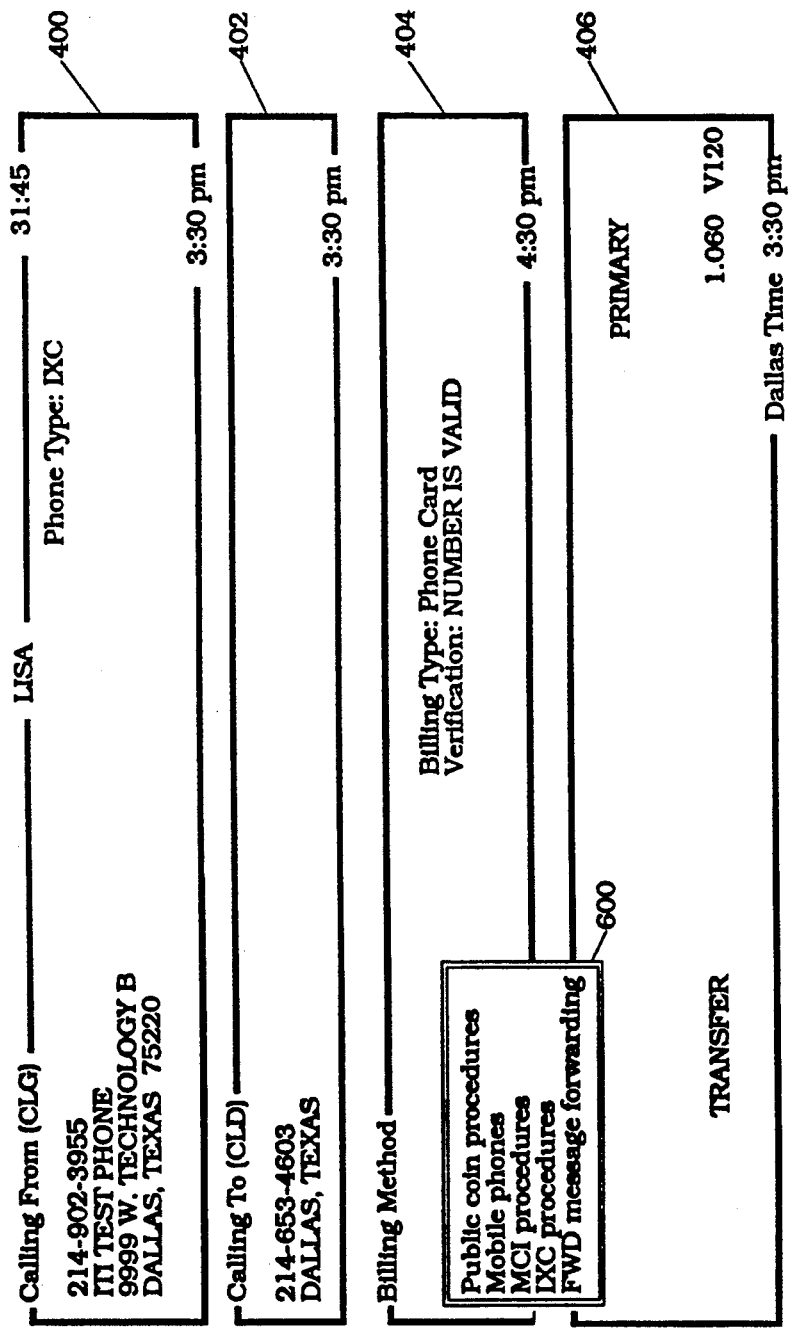

Other information can be made available to the operators by way of service menus. Such menus can be helpful to provide the operator with yet additional information concerning procedures for carrying out different, seldom-used telephone procedures. FIG. 6a illustrates an overlay menu 600 that covers a portion of menus 404 and 406 of the base menu set. The menu 600 is utilized to assist the operator in helping a calling party complete a call from a nonregistered telephone, such as public coin phone, a mobile phone, MCI procedures, ITX procedures or message forwarding procedures. If the calling party is calling from a public coin phone, the operator can locate the cursor next to such entry in menu 600, whereupon the menu 602 of FIG. 6b is displayed. As noted in the enclosed portion of the menu 602, there are listed the methods of paying for a long distance telephone call made from a coin type of telephone. Under the enclosed portion of menu 602, there is displayed text for instructing the calling party as to the procedures for completing the call and the digits to dial to be connected to the destination. For example, if local dialing instructions are requested by the calling party, the operator can review the dialing instructions set forth in the menu 602 of FIG. 6b and instruct the party to hang up and dial "0" for a local operator who can provide such assistance. Menu instructions are also provided on how to reach another long distance operator service organizations to complete other types of long distance telephone calls.

Figure 6C:
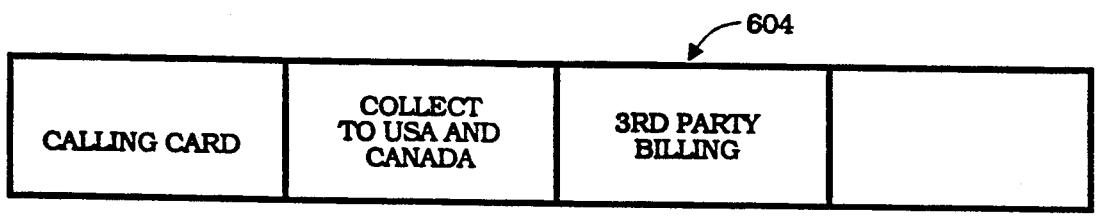

FIG. 6c illustrates a menu 604 that is displayed in selecting the second entry from menu 600 of FIG. 6a. Menu 604 is for use with incoming calls from mobile telephones for travelers on luxury buses, or the like. Again, the enclosed portion of menu 604 displays the types of billing methods allowed, and thereunder the instructions which may be relayed to the calling party.

FIG. 6d illustrates the menu 606 displayed when the operator selects the third entry of overlay menu 600 FIG. 6a. The menu 606 provides the operator with the detailed information necessary to complete the extension of calls using the MCI common carrier.

FIG. 6e is a service overlay menu 608 for assisting an operator with respect to long distance telephone calls made through inter-exchange carriers (IXC). As noted above, such type of carriers do not have their own operator service facilities, but rather contract with an operator service system, such as described above. The overlay menu 608 also includes textual instructions to the operator, as well as other carriers and associated telephone numbers for use in completing long distance telephone calls.

FIG. 6f illustrates a menu that is displayed when the operator selects the entry "ICX Procedures" of the overlay service menu 600 of FIG. 6a. Menu 610 shows the phone number of the IXC customer service that the calling party would call with questions about their service or billing information.

FIG. 6g illustrates yet another service menu 612 selectable from overlay menu 600 for assisting the operator in forwarding messages from the calling party. This overlay service menu 612 includes an inset 613 describing the methods of billing allowed, as well as textual information to assist the operator. This menu is particularly useful in voice messaging techniques when the called party is busy or doesn't answer and the calling party wishes to leave a voice message. The calling party's message is temporarily stored, and a voice messaging system then attempts to forward the message to the destination a prescribed number of times. The overlay service menu 612 illustrates the text that can be used by the operator in assisting the calling party as to the procedures for leaving a voice message.

Figure 7A:
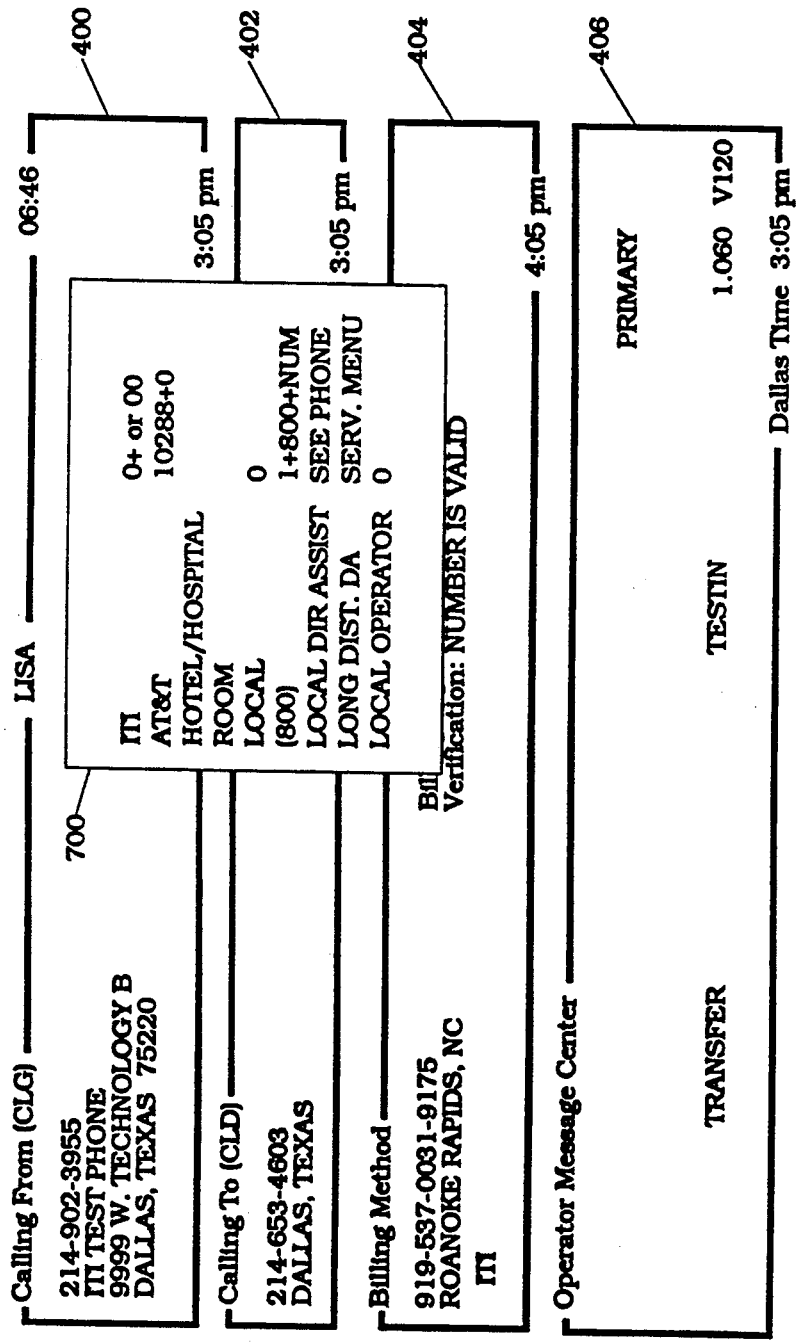
FIGS. 7a-7d illustrate operator terminal screen displays and overlay menus concerning dialing assistance, transfer menus, and trouble report menus.

Additional menus are available to the operator workstations by keyboard selection of the operator. For example, by depressing key 86, "DIAL INST", the menu shown in FIG. 7a is displayed. The overlay menu 700 is a list of different types of operators and the associated telephone numbers that can be communicated to the calling party for completing the call. For example, different types of operators and telephone numbers are listed, different types of outside lines are identified and the associated telephone numbers, as well as direct dial numbers. Local and toll numbers are also listed in the overlay menu 700. In the event the operator at the workstation 18 cannot complete the call because of LATA restrictions, the "ACT" key 90 can be depressed. The "ACT" key will only work when the Dialing Instructions menu is displayed, and is used to connect the calling party with either an AT&T or Local operator. The "ACT" key sends out an electronic tone signaling the transferring mechanism in the phone the calling party is using thereby causing the calling party to be transferred to another operator service. When the transfer is successful the message "HUNG UP" will appear in the Calling From menu 400. The operator will then press the "CALL RLS" key 102 to release the workstation from the current call and make it available to receive another call.

Figure 7B:
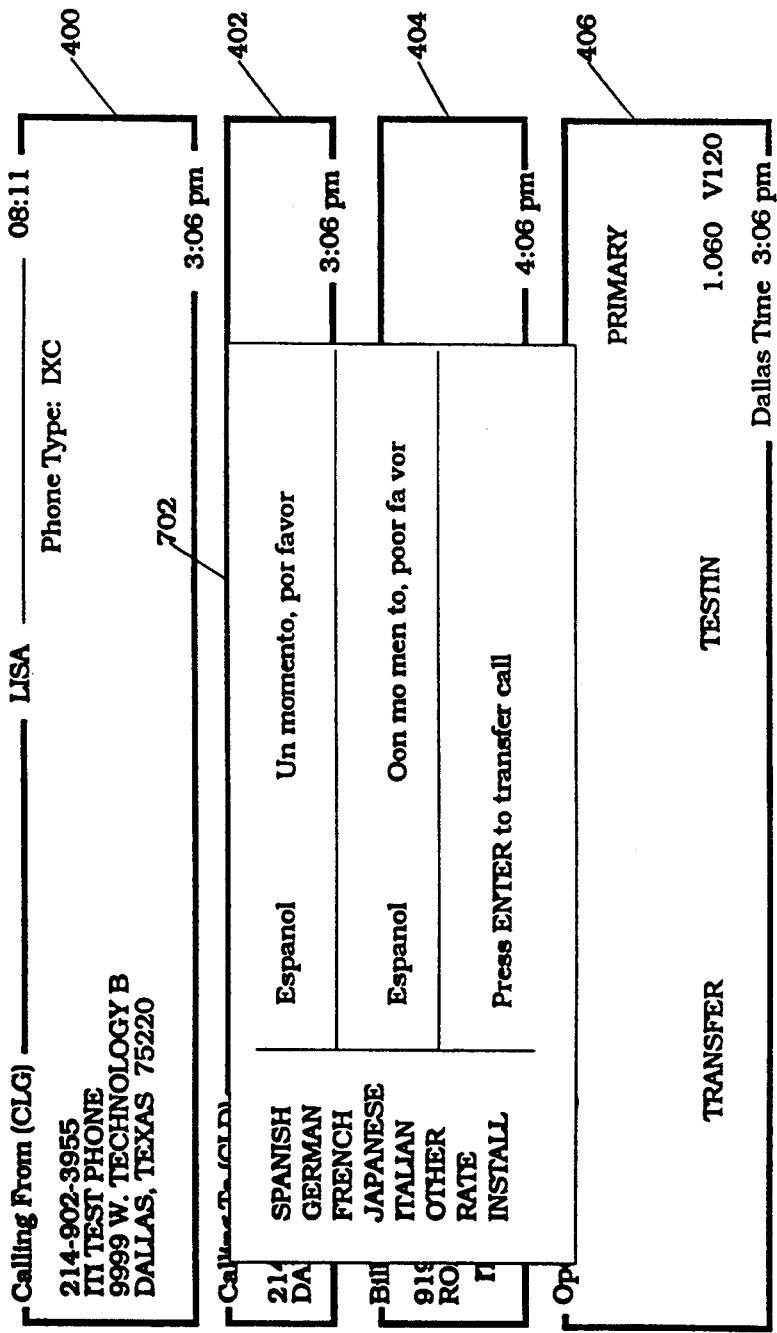

FIG. 7b depicts a language translation menu, should the operator require assistance in communicating with the calling party in a different language. This menu is displayed by depressing the "TRANSF MENU" key 82. Listed at the left-hand portion of the overlay menu 702 is a listing of different countries that can be cursor-selected by the operator. Assuming, for purposes of example, that the Spanish language is selected by the operator. Two lines of Spanish text appear, the upper line giving the spelling in Spanish of a Spanish text phrase which has the meaning "one moment please." The bottom line includes the phonetic pronunciation of the phrase so that the operator can pronounce the phrase in Spanish to the calling party. The foregoing assumes that the operator can distinguish between different languages spoken by the calling party and make a decision which language menu to select. After the operator repeats the phrase noted in the overlay menu 702, the "ENTER" key 64 is depressed to transfer the call to another operator who can speak Spanish. Had a Japanese language entry been selected in the menu 702, a Japanese phrase corresponding to "one moment please" would have been displayed, and the depression of the "ENTER" key 64 would cause transfer of the call to an operator capable of speaking Japanese. Certain operator positions of the system 10 are preselected and manned by persons having multilingual language capabilities. Therefore, the operator can automatically direct the telephone call to the appropriate operator. Below the basic menu set are other textual phrases to assist the operator in transferring the call to other specialized operators, for instance, a rate operator or an installation operator.

Figure 7C:
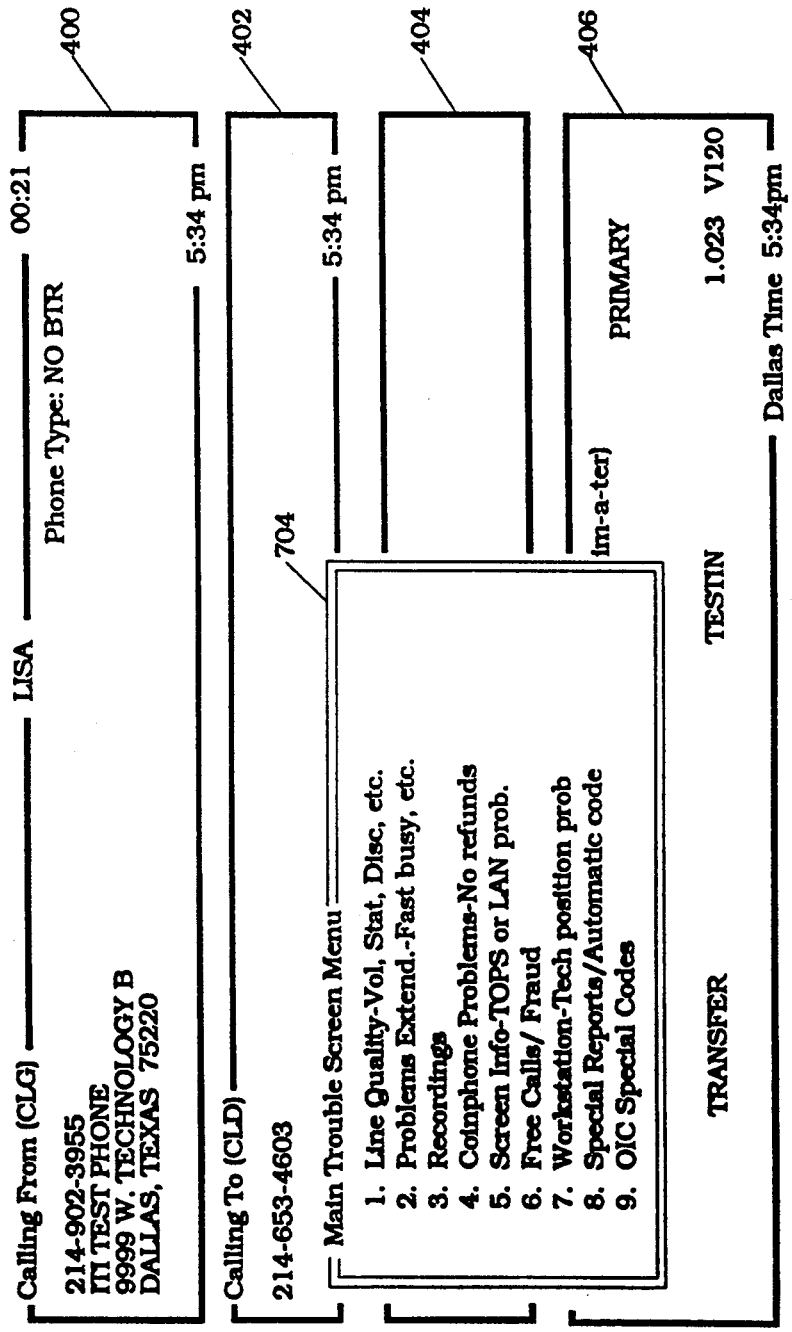
Figure 7D:
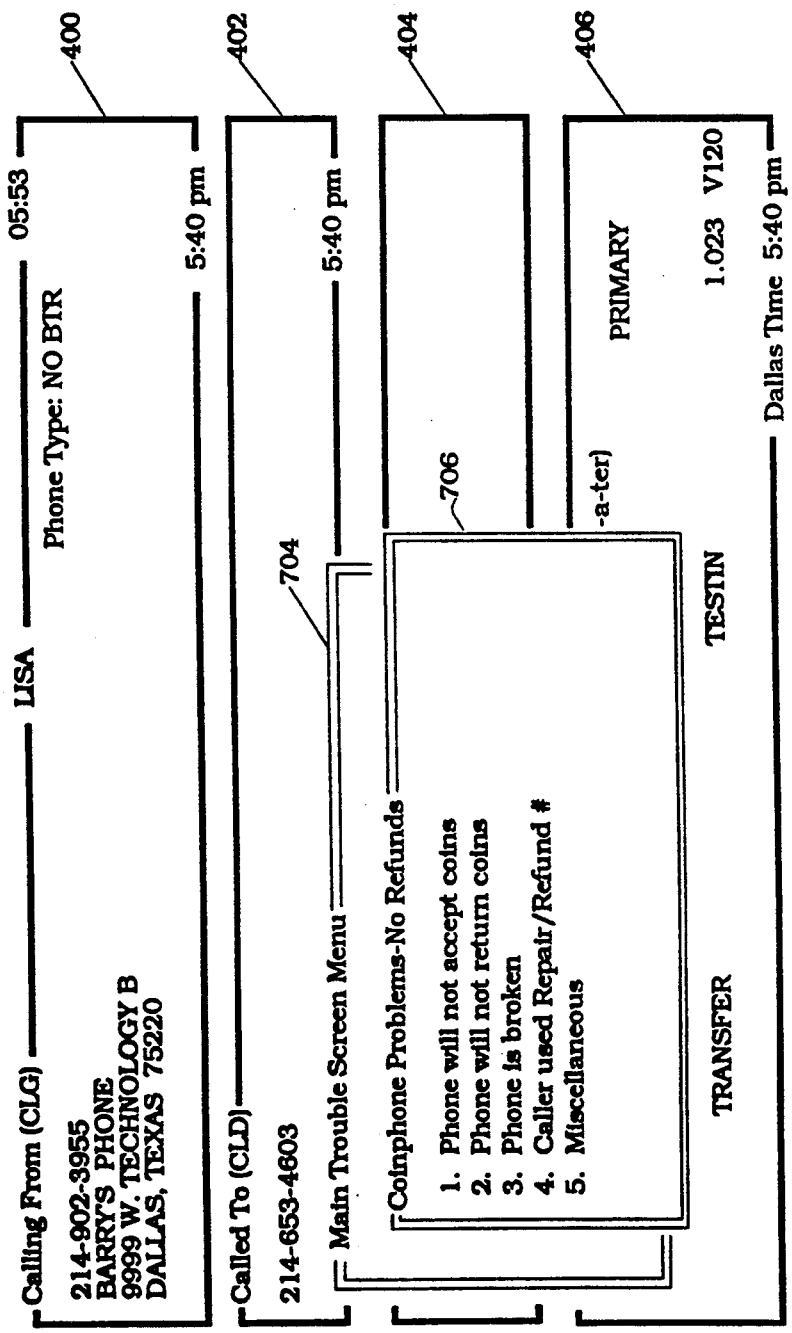

A very important feature of the invention is the detailed and technically advanced system for reporting various kinds of trouble. FIG. 7c illustrates an operator service screen that can be selected by pressing "TRBL #" key 78. Menu 704 shows a listing of the types of troubles that can be reported. By pressing the corresponding number and another menu 706 will appear, FIG. 7d, giving the operator a more detailed choice. Again by selecting the corresponding number, a third menu will appear (not shown) giving still more detail. All trouble codes generate a printed record for the department responsible for correcting the reported trouble and/or issuing credit.

Figure 8A:
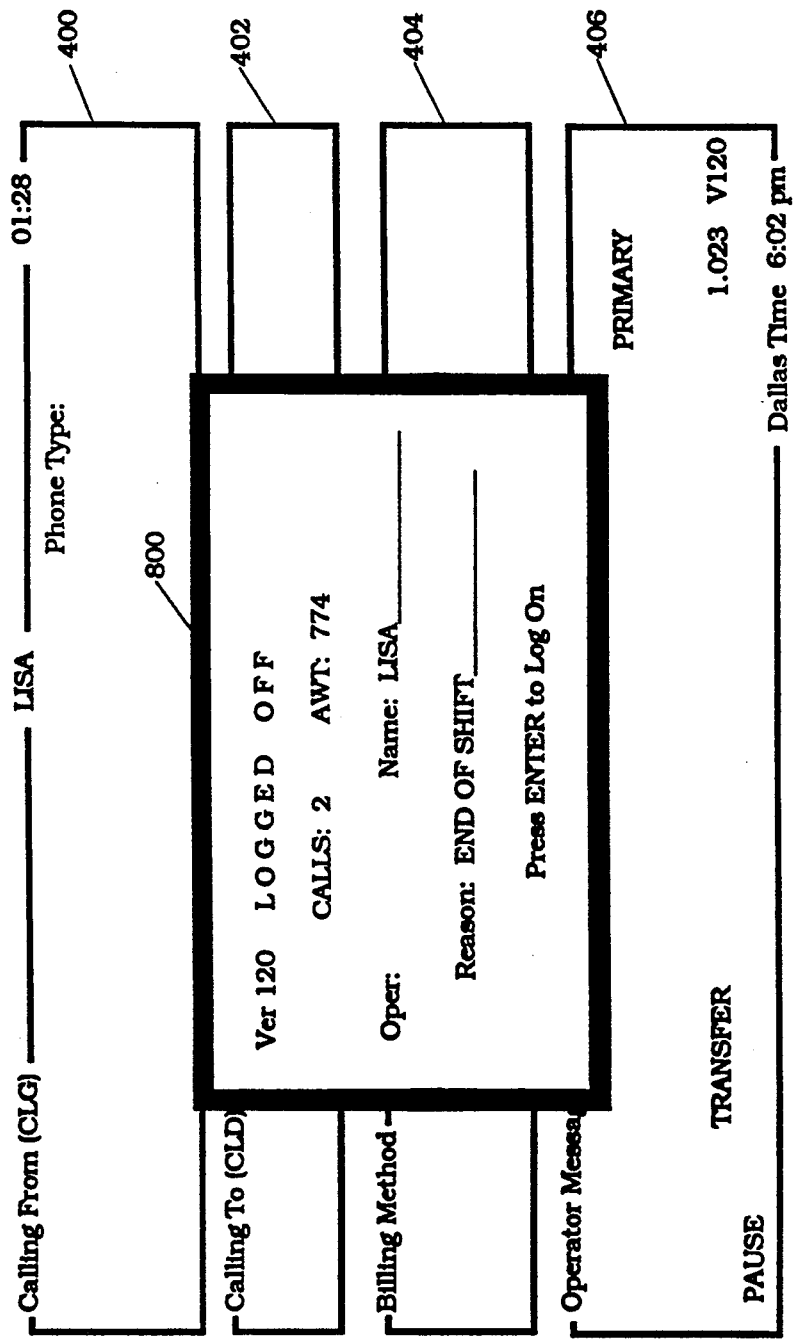
FIGS. 8a and 8b are screen displays to facilitate log on and log off by the operators of the workstations.
Figure 8B:
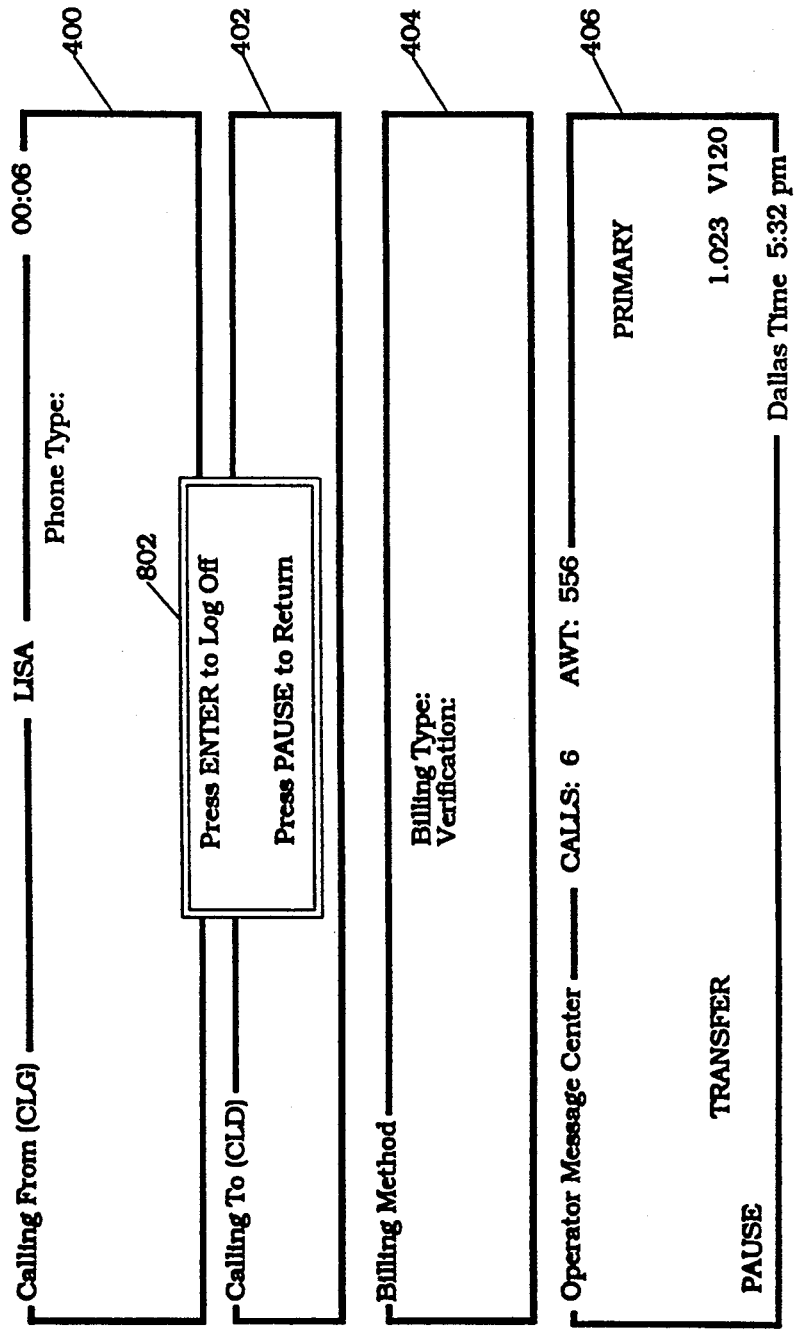

FIG. 8b depicts the base menu set, 400–406, overlaid with a menu 800 that is displayed in response to the keyboard depression of the "PAUSE" key 84. The overlay menu 802 includes two lines selectable by the operator, one for logging off with respect to the workstation 18, and another entry to log on and resume operation of the workstation 18. The first entry is selectable by the operator by positioning of the cursor adjacent thereto, and includes the instruction to press "ENTER" to log off. Hence, the operator can simply press the "ENTER" key 64 to log off so that the workstation 18 signals the switching system 12 so that the workstation no longer receives incoming calls. When the operator, or another operator, returns to the workstation 18, the menu of FIG. 8a yet appears and the operator can then return or resume operation of the workstation 18 by pushing the "PAUSE" key 84. When the operator logs off operation of the workstation 18 by pressing the "ENTER" key 64, the overlay menu shown in FIG. 8a is displayed. The overlay menu 800 includes an entry space by the operator of his/her name and the reason for logging off the workstation 18. The base menu set and overlay 800 shown in FIG. 8a remain displayed on the screen 42 until the workstation again becomes operable by the operator entering a name, operator ID, and the depression of the "ENTER" key 64, such instruction being displayed at the bottom of overlay menu 800. The switching system 12 is then signaled that the workstation is idle and can receive incoming calls.

During the servicing of incoming calls, an operator may want to speak with a supervisor, or otherwise temporarily halt incoming calls. To do this, the operator actuates the "PAUSE" key 84, and the switching system is signaled to temporarily halt the distribution of calls to the workstation 18. When "PAUSE" key 84 is depressed the first time to halt incoming calls, the display 802 of FIG. 8b is displayed. To resume call processing, the operator depresses the "PAUSE" key 84 a second time and menu 802 disappears.

Figure 9A:
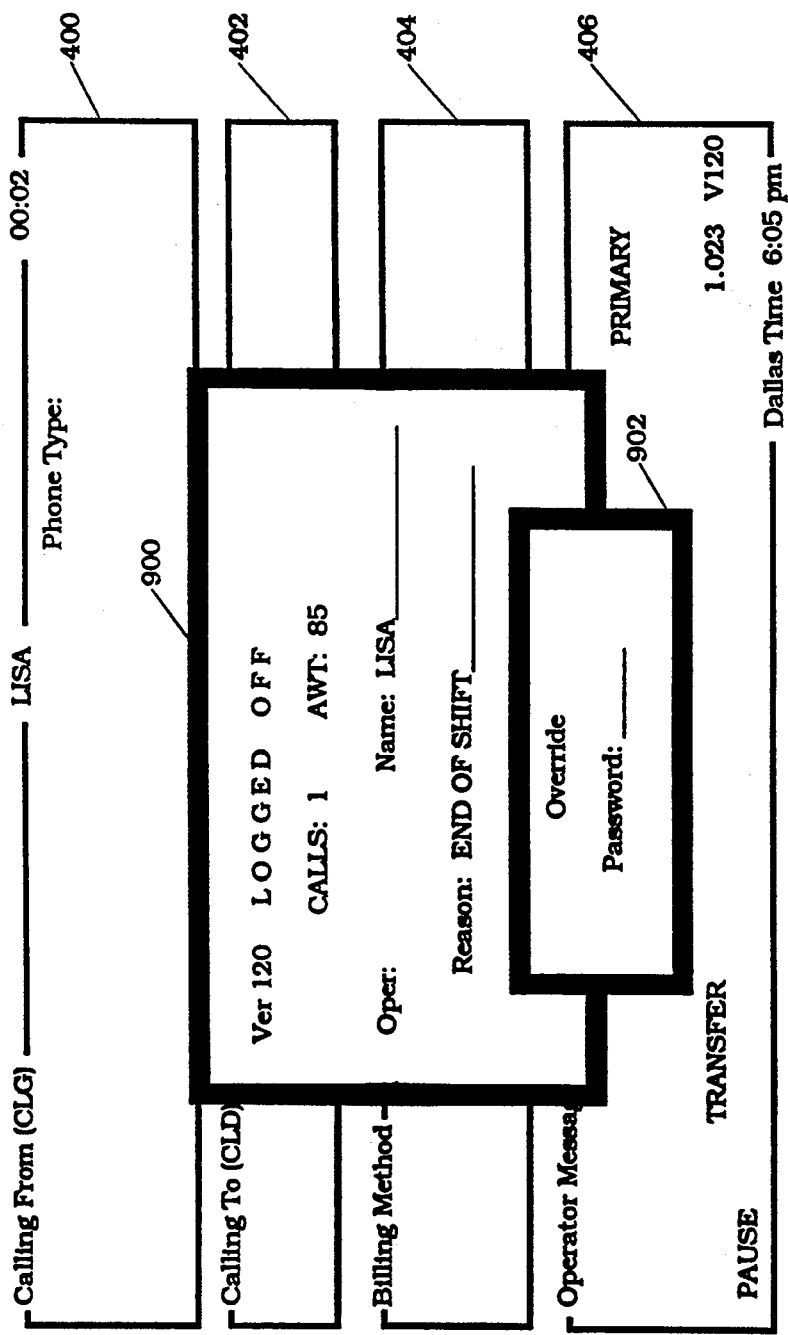
Figure 9B:
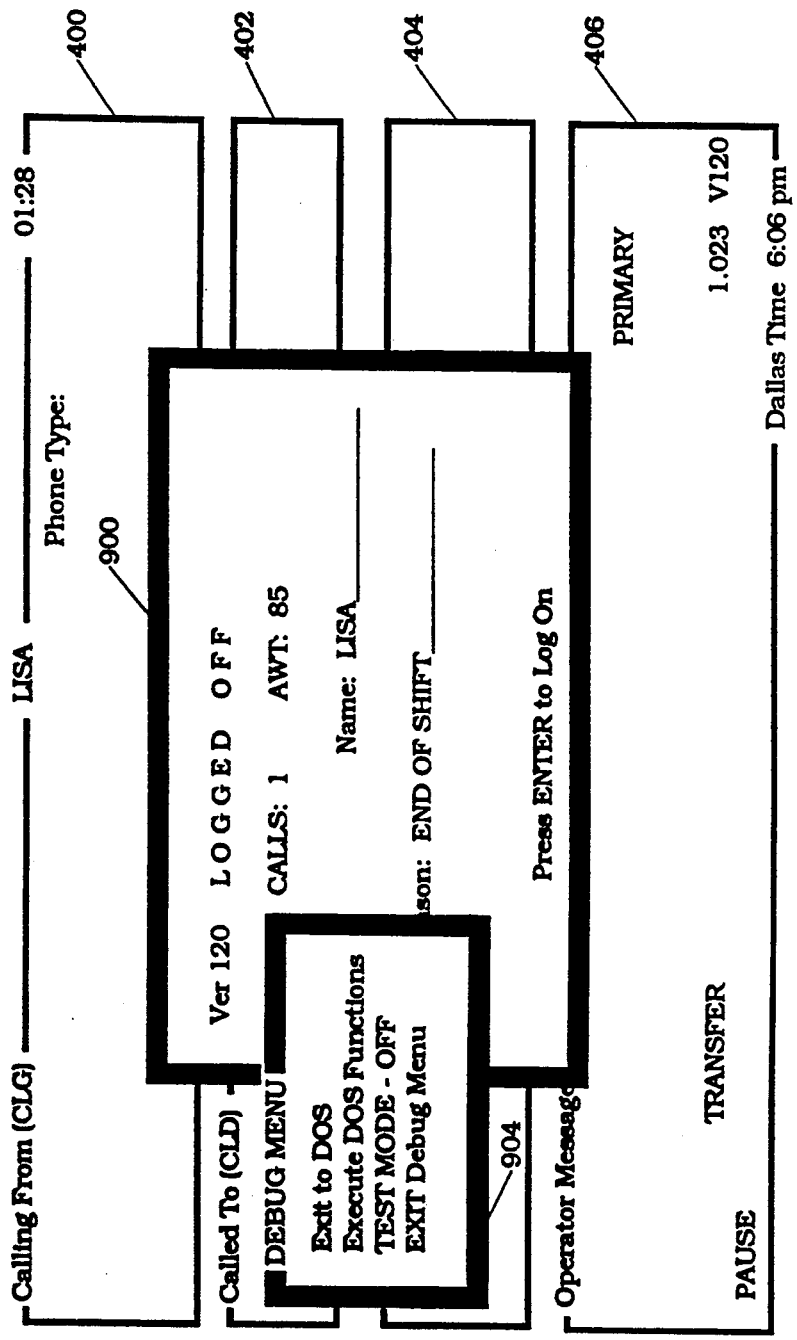

FIGS. 9a and 9b illustrate other screen menus used by personnel other than the operators. When a programmer or engineer needs to conduct special processing of testing at a workstation 18, at the "Logged-Off" menu, they press the "ESC" key. Then, they enter a special password FIG. 9a to access a "DEBUG" menu 904 shown in FIG. 9b. The Debug menu allows the programmer or engineer to perform several special functions. They can remove the software program from the memory of this workstation 18 and return to the computer's disk operating system (DOS). They can suspend the processing of the call processing program (not remove from memory) and execute DOS command functions and then return to the call processing program. They can put the workstation 18 in a test mode to monitor the call processing steps without processing any "Live" calls. The final selection "Exit" will return to normal call processing of the workstation 18.

The screen display of FIG. 9c contains special functions to modify the workstation's environment and analyze the call processing functions, as desired by maintenance or repair persons.

Figure 10:
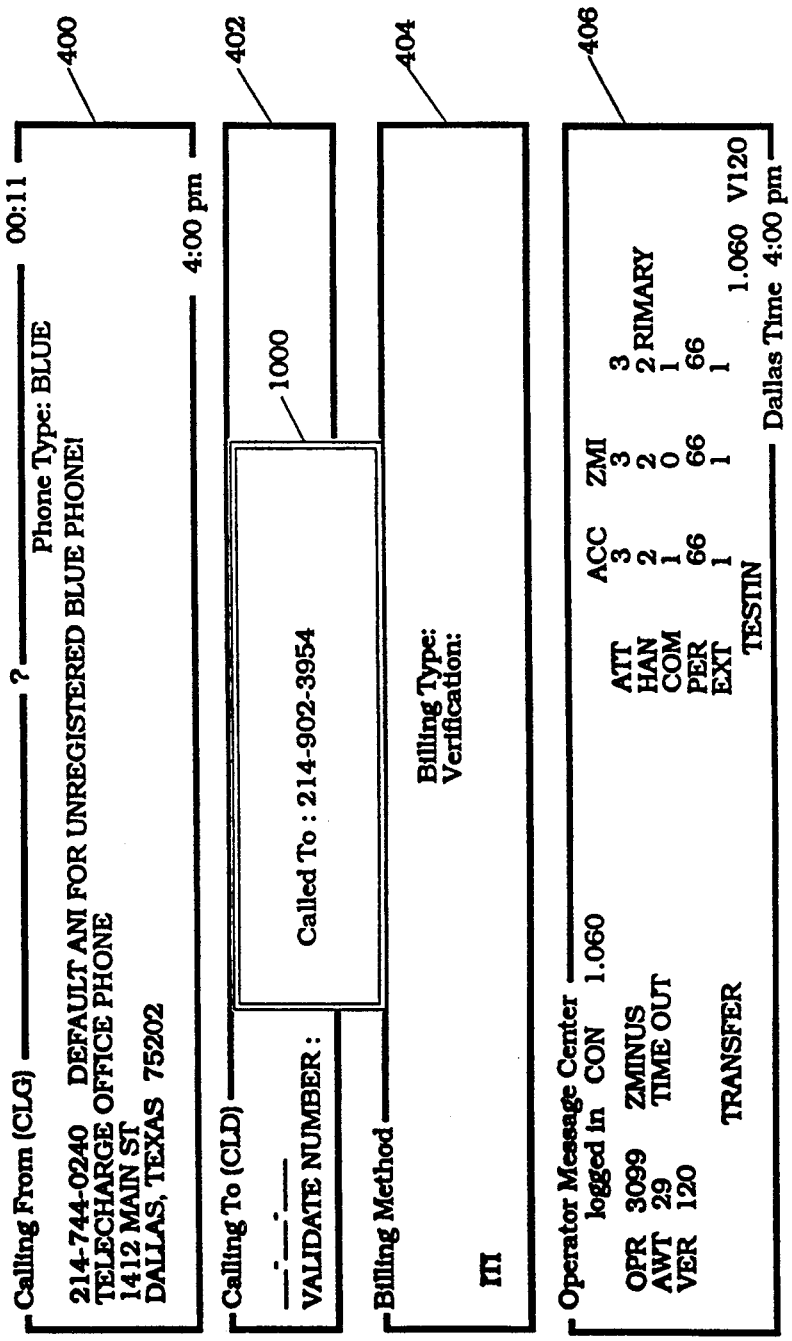
FIG. 10 is a screen display of a menu associated with a robot workstation.

FIG. 10 is a screen display especially adapted for the automated operator stations, or robot 16, shown in FIG. 4a. Displayed in the Operator Message Center menu 406 is specific information that apply to this automated operator station. The left side of the menu 406 presents information concerning this robot, i.e, the operator number of this robot, the average work time for processing calls on this robot, the current version of the programming being used and the disposition of the last call presented to this robot. The right side of the menu 406 presents statistical information concerning this robot, i.e, the total number of calls presented to this robot "ATT", the total number of calls handled by this robot "HAN", the total number of calls completed by this robot "COM", the percentage of handled calls to presented calls "PER", and the total number of calls extended to the called party by this robot. Also displayed on the right side of the menu 406 are the totals for the automated collect calls "ACC" and zero minus calls "ZMI" handled by this robot.

According to the foregoing, it can be seen that a technical advantage of the invention is that substantial additional information is provided to operators, which information is easily accessed and presented in an orderly and efficient manner. In addition, a technical advantage presented by the invention is that numerous data bases are generated with information that is likely to be used in completing a host of different types of telephone calls, which information is quickly accessed and presented in response to the particular type of call to be serviced. Another technical advantage of the invention is that the program controlled workstation processor is interrupt and table driven to provide quick and efficient display of information to the operator. An important technical advantage of the invention is that, based upon the type of call to be completed, the program control processor can allow or disallow various options of the operator in completing the call, thereby increasing efficiency and preventing inadvertent or fraudulent results. Yet another technical advantage of the invention is that operators can become more efficient by the use of the invention, training time of operators is reduced, and thus the cost of operations is minimized.

While the preferred embodiment of the invention has been disclosed with reference to specific system apparatus, functions and programmed displays, it is to be understood that many changes in detail may be made as a matter of programming or engineering choice, without departing from the spirit and scope of the invention as defined by the appended claims.

TABLE 1

V&H.DAT
Telephone Location and Install Information
and Billing Arrangements

| DESCRIPTION | SIZE IN BYTES |
| --- | --- |
| NPANXX | 6 |
| TIME ZONE | 1 |
| STATE | 10 |
| CITY | 50 |
| VERTICAL | 6 |
| HORIZONTAL | 6 |
| LATA | 5 |
| LATA SUB ZONE | 2 |
| VALID GEOGRAPHICAL NPA | 3 |
| NON-DIALABLE FLAG | 1 |
| IDDD INDICATOR | 1 |
| TYPE OF CARRIER | 1 |
| DAYLIGHT SAVINGS TIME | 1 |
| COIN CHECK | 10 |
| BILL TO RAO | 3 |
| OPERATING COMPANY | 4 |
| OTHER LINE CHARGE | 1 |
| TOLL CHRG RATE STEP | 2 |
| VALIDATION SERVICE TO USE | 1 |
| COMPANY CODE | 2 |
| EQUAL ACCESS | 1 |
| ICX BILL | 1 |

TABLE 2

ANI.DAT
Customer Information

| DESCRIPTION | LENGTH IN BYTES |
| --- | --- |
| ANI | 10 |
| INITIALS | 3 |
| DATE | 6 |
| NSTALL NUMBER | 10 |
| SUBSCRIPTION NUMBER | 10 |
| PROPERTY 1 | 30 |
| PROPERTY 2 | 40 |
| STREET | 20 |
| CITY | 12 |
| STATE | 2 |
| ZIP | 10 |
| CREATION DATE | |
| LOCATION TYPE | 2 |
| TROUBLE CODE | 6 |
| TROUBLE DATE | 6 |
| PHONE TYPE | 1 |
| COIN TYPE | 1 |
| DIALER TYPE | 1 |
| LINE TYPE | 1 |
| DOTS TYPE | 1 |
| SERVICE TYPE | 1 |
| ITI DIALING INSTRUCTIONS | 10 |
| ATT DIALING INSTRUCTIONS | 10 |
| HOTEL DIALING INSTRUCTIONS | 10 |
| ROOM DIALING INSTRUCTIONS | 10 |
| BILL TO ROOM | 10 |
| LOCAL DIALING INSTRUCTIONS | 10 |
| EMERGENCY NUMBERS | 10 |
| 800 DIALING INSTRUCTIONS | 10 |
| 900 DIALING INSTRUCTIONS | 10 |
| FLAGS | 8 |
| COMMENTS | 48 |
| SIC CODE | 3 |
| ONE PLUS FLAG | 1 |
| DTMF TESTED FLAG | 1 |
| DTMF OVERRIDE FLAG | 1 |
| FRAUD FLAG | 1 |
| BLOCK 800 FLAG | 1 |
| MESSAGE FORWARDING FLAG | 1 |
| UNBILLABLE OVERRIDE | 1 |
| BLOCK OVERRIDE | 1 |
| FILLER | 5 |

TABLE 3

PHONE.DAT
Fraud and Validation Information

| DESCRIPTION | SIZE IN BYTES |
|---|---|
| BILL TO NUMBER | 5 |
| HOTEL LIMIT | 1 |
| HOTEL COUNT | 1 |
| OTHER LIMIT | 1 |
| OTHER COUNT | 1 |
| BAD PIN ATTEMPTS | 1 |
| TOTAL COUNT | 2 |
| SOURCE | 1 |
| COUNT SINCE VERIFIED | 1 |
| DATA LAST USED | 2 |
| CREATION DATE | 2 |
| DATE LAST VALIDATED | 2 |
| PIN | 2 |
| CSREP MODIFIED | 2 |
| BIT FLAGS | 2 |
| Billing Arrangement Okay | |
| Collect Okay | |
| Third Party Okay | |
| Calling Card Okay | |
| Valid Pin Okay | |
| Delete Okay | |
| Att Okay | |
| Good Hotel | |
| CSREP INTITIALS | 3 |
| CSREP REASON | 1 |
| FILLER | 2 |
| RFA | 6 |
| UNPACKED BTN | 14 |
| STATION | 4 |
| OKAY FLAG | 1 |
| HOTEL FLAG | 1 |
| BILLING METHOD USED | 1 |

TABLE 4

CDR.DAT

| DESCRIPTION | SIZE IN BYTES |
|---|---|
| Call Detail Records | |
| TYPE | 1 |
| MONTH | 2 |
| DAY | 2 |
| YEAR | 2 |
| HOUR | 2 |
| MINUTE | 2 |
| SECOND | 2 |
| CLG NUMBER | 12 |
| TNI NUMBER | 12 |
| BTN NUMBER | 26 |
| CREDIT CARD NUMBER | 14 |
| EXPIRATION DATE | 4 |
| COUNTRY ID | 3 |
| NAME | 30 |
| DURATION | 4 |
| START TIME OF CALL | 4 |
| VERIFICATION TIME | 4 |
| VERIFICATION RESULTS | 1 |
| OPERATOR NUMBER | 4 |
| VERSION NUMBER | 3 |
| TROUBLE CODE | 2 |
| STATION NUMBER | 4 |
| SEQUENCE NUMBER | 10 |
| TRUNK GROUP | 6 |
| CALL TYPE | 3 |
| CLASS MARK | 3 |
| TRANSFER FLAG | 1 |
| TRANSFER REASON | 1 |
| PHONE TYPE | 2 |
| TRUMP FLAG | 1 |
| DETAIL REQUEST COUNTER | 1 |
| TOPS NUMBER | 4 |
| BASE PHONE TYPE | 2 |
| FILLER | 20 |
| 'B' Records are Different | |
| TYPE | 1 |
| MONTH | 2 |

TABLE 4-continued

CDR.DAT

| DESCRIPTION | SIZE IN BYTES |
|---|---|
| DAY | 2 |
| YEAR | 2 |
| HOUR | 2 |
| MINUTE | 2 |
| SECOND | 2 |
| CLG NUMBER | 12 |
| CLD NUMBER | 12 |
| OPERATOR NUMBER | 4 |
| STATION | 4 |
| NAME | 30 |
| STREET | 30 |
| CITY | 30 |
| STATE | 10 |
| ZIP CODE | 10 |
| AMOUNT | 4 |
| REASON | 3 |
| SEQUENCE NUMBER | 10 |
| TROUBLE CODE | 2 |
| REMARKS | 20 |

TABLE 5

| DESCRIPTION | SIZE IN BYTES |
|---|---|
| CC.DAT | |
| Country Codes | |
| CODE | 5 |
| COUNTRY CODE TYPE | 1 |
| COUNTRY NAME | 20 |
| CITY CODE | 4 |
| BLOCKED | 1 |
| FILLER | 5 |
| NPAS.DAT | |
| Area Codes | |
| NPA | 3 |
| MESSAGE 1 | 16 |
| MESSAGE 2 | 16 |
| TRBL.DAT | |
| Trouble Codes | |
| TROUBLE CODE | 4 |
| YEAR | 2 |
| MONTH | 2 |
| DAY | 2 |
| HOUR | 2 |
| MINUTE | 2 |
| SECOND | 2 |
| ANI | 12 |
| TNI | 12 |
| OPERATOR | 4 |
| STATION | 4 |
| TRUNK | 6 |
| TYPE | 2 |
| ROUTING | 8 |
| OLD CODE | 2 |
| CALL TYPE | 3 |
| CLASS MARK | 3 |
| REMARKS | 30 |
| REMARKS 1 | 30 |
| REMARKS 2 | 30 |
| SEQUENCE NUMBER | 4 |
| BTN | 16 |
| FILLER | 20 |

TABLE 6

Flags (one bit each)

OVERRIDE ALL
ALLOW COLLECT
ALLOW COLLECT OVS
ALLOW COLLECT 809
ALLOW COLL TO UNBIL

ALLOW 3RD PRTY TO UNBIL
ALLOW UNBILLABLE BILLING
ALLOW STATION PAID
ALLOW PERSON PAID

TABLE 6-continued

Flags (one bit each)

ALLOW BTR

ALLOW BTR INTERNATIONAL
ALLOW BTR DOMESTIC
ALLOW 3RD PARTY
ALLOW 800
ALLOW BLOCKED COUNTRY

ALLOW INTERNATIONAL
ALLOW CALLS TO NPA 706
ALLOW CALLS TO MEXICO
ALLOW CALLS TO NPA 905
ALLOW CALLS TO NPA 908

ALLOW CALLS TO NPA 909
ALLOW CALLING CARD
ALLOW ATT SCRAMBLED
ALLOW NON SCRAMBLED
ALLOW RBOC SCRAMBLED

ALLOW AMERICAN EXPRESS
ALLOW MASTER CARD
ALLOW VISA
ALLOW DINERS
ALLOW CARTE BLANCHE
ALLOW ENROUTE
ALLOW ITI CARD

ALLOW INTRALATA
ALLOW INTRASTATE
ALLOW CALLS TO NPA 809
TRUNK GROUP MATCH
ALLOW CALLING CARD TO UNBIL

ALLOW BILLING TO 976-550-555
ALLOW CALL TO TNI 976
ALLOW AUTO COLLECT
ALLOW ZERO MINUS
REQUIRE 3RD PARTY VERIFY

ALLOW 900
ALLOW 700
ALLOW NXX-950
REQUIRE NAME BTR
REQUIRE BRI VERBAL VERIFY

ALLOW V I X VALIDATION
ALLOW "ALL" CALLS TO 809

Flags 50-64 are not used

What is claimed is:

1. A system for controlling telephone operator terminals, comprising:
a plurality of operator terminals, each having audio facilities, a display and a keyboard;
a telephone switching system for receiving incoming requests for service and associated automatic number identification (ANI) numbers, and for connecting incoming calls to idle operator terminals so that an operator can communicate with a calling party to provide assistance; and
a computer data base accessible by each said operator terminal for providing information to said operator terminals, said data base having stored therein information cross-referenced by the ANI numbers associated with telephones of calling parties, said data base information defining actions allowed for calls associated with the respective ANI number, whereby when an ANI number is transferred from an operator terminal to the data base, said operator terminal causes access of data related to the ANI number and causes display of the data on the respective operator terminal, and wherein progress of the incoming calls is carried out in accordance with said data base information cross-referenced to the respective ANI numbers, whereby the operator has available visual information concerning the telephone set of the calling party.

2. The system of claim 1, wherein said data base information includes a list of call actions disallowed for each ANI number, and further including a program controlled processor for preventing call processing actions for an ANI number that are flagged as being disallowed in the data base.

3. The system of claim 1, wherein in response to an incoming call to a selected one said operator terminal, said operator terminal receives TNI information, and said operator terminal causes access of the data base for retrieving called party telephone set information for display on the operator terminal.

4. The system of claim 1, wherein said data base stores information relating to a method of billing for each ANI number, and wherein said data base is accessed using said ANI number for display of the appropriate method of billing.

5. The system of claim 1, wherein each said operator terminal is programmed to be interrupt driven by said switching system and by a computer associated with said data base.

6. The system of claim 1, wherein said operator terminal keyboard includes a key responsive to actuation thereof for extending an incoming call to destination information pointed to by a cursor on said display.

7. The system of claim 6, wherein said operator terminal is programmed to cause a data base to be searched with respect to LATA boundaries and a terminating number identification (TNI) number input by the calling party, and if LATA boundary restrictions are approved with respect to a call of the TNI number, said terminal responds to a keyboard key actuation to extend the call to a telephone set associated with the TNI number, and if the LATA boundaries are not approved, said operator terminal does not extend the call despite an actuation of the keyboard key.

8. The system of claim 1, further including a computer connected by a local area network to each said operator terminal, said computer for accessing the data base in response to requests via said network from said operator terminals.

9. The system of claim 1, further including a plurality of said operator terminals, each having a memory programmed with substantially identical programs.

10. A telephone operator terminal system, comprising:
a visual display and a keyboard for use by an operator in assisting a calling party;
a processor and a data base accessible by the processor, said data base storing data for displaying images and information on the visual display; and
said data base for storing data presenting a base display on the visual display, including
a) a first area located in a first predefined area of the visual display for displaying calling party information including a telephone number of the calling telephone set, an address, city and state where the calling telephone set is located,
b) a second area located in a second predefined area of the visual display for displaying called party information, including a telephone number of a called telephone set and city and state information where the called telephone set is located; and said processor causing access of the data base for cross-referencing calling number information with billing methods allowed with said calling number, said processor displaying the allowed billing methods, and being responsive to a selected one of the allowed billing methods to display a subsidiary display for entry therein of information to complete the call with the selected method of billing, and preventing the processing of billing methods not allowed.

11. The system of claim 10, further including a switching system selectively connecting calling parties to the operator terminal, said switching system forwarding ANI and TNI numbers to the operator terminal.

12. The system of claim 10, further including a data base for storing calling telephone set information and for storing called telephone set information, said operator terminal obtaining said information by assessing a computer data base.

13. The system of claim 10, further including data in said data base for presenting a subsidiary display area for each method of billing allowed with respect to the calling party information.

14. The system of claim 10, further including data in said data base for presenting a display area for displaying information assisting an operator, including a status of the call.

15. The system of claim 10, wherein said data base stores LATA boundary information, and based on called destination information, the processor carries out programmed instructions to decide if the call is inter-LATA and can be completed, or if the call is intra-LATA and prevents the operator from completing the call.

16. The system of claim 10, wherein said calling party information display includes a local time of the calling party, and the called party information display including a local time of a called party.

17. The system of claim 10, wherein the calling party information area and the called party information area are displayed in different background colors of respective windowed areas.

18. The system of claim 10, wherein the operator terminal displays a time that has elapsed in which the operator is serving the calling party, and wherein said elapsed time is displayed in the calling party information area.

19. The system of claim 10, further including a method of billing display area comprising a plurality of different methods of billing entries, and wherein said keyboard can be actuated to move a cursor adjacent a desired one of said method of billing entries, and wherein said operator terminal responds to a key actuation to select an overlay area displaying detailed method of billing information related to the selected method of billing entry.

20. The system of claim 19, wherein said method of billing information display area is automatically displayed by said processor if said call is determined by said processor to be inter-LATA.

21. The system of claim 10, wherein said calling party and said called party areas are enclosed in lined borders, and further including overlay window areas overlying respective said calling party or called party areas, said overlay windows being in lined borders and including the display of information to the operator for completing the call.

22. The system of claim 19, wherein said method of billing overlay window areas include areas to be filled in with information by the operator, and wherein when said areas are filled in with information, said processor causes the overlay window areas to automatically disappear.

23. The system of claim 19, wherein said method of billing display areas display allowed billing options at one brightness, and display unallowed billing options at a dimmed brightness.

24. The system of claim 10, wherein said data base stores in association with an ANI number related to a telephone set, a plurality of other telephone numbers associated with emergency services in a geographical area of the telephone set.

25. The system of claim 24, further including storing in association with each emergency telephone number, an identification associated with a provider of said emergency services.

26. The system of claim 10, wherein said data base stores in association with ANI numbers, specific dialing instructions appropriate in a geographical area of the telephone set associated with the ANI number, said dialing instructions indicating telephone numbers for further assisting the calling party.

27. The system of claim 10, wherein said data base stores foreign language phrases for assisting the operator in serving the calling party, and pneumonics related to the pronunciation of the foreign language phrases.

28. The system of claim 10, wherein said data base stores in association with an ANI number related to a telephone set, a number of times a calling party using the telephone set associated with the ANI number requests a refund, and a cumulative count of said number of times providing an indication of a faulty telephone set.

29. The system of claim 10, wherein said data base stores area code information for each state of the United States, and for each geographical area within a state having a different area code.

30. The system of claim 10, wherein said data base stores ANI numbers related to respective telephone sets, and stores in association with the ANI numbers an indication of a common carrier to carry calls with respect to calls initiated by the telephone sets, and wherein said processor accesses the data base in response to an incoming call and with respect to an ANI number received by the operator terminal, said processor displays on the terminal the indication of the common carrier for carrying out the call.

31. The system of claim 30, wherein said data base also stores in association with each ANI number an indication of an operator service organization for providing assistance to calls initiated with associated said telephone sets, and wherein said processor displays said indication on the operator terminal display.

32. An operator terminal for use by an operator in assisting calling parties, comprising:
a display for displaying information;
audio equipment providing communications between an operator and a calling party;
a keyboard for input of information by the operator;
a memory for storing a program for carrying out call processing in response to incoming calls and keyboard inputs;

a processor for carrying out instructions of said program, said processor responding to incoming calls and being responsible to
  a) ANI information for causing a data base to be accessed to retrieve calling party information associated with the ANI information and displaying said calling party information on the display,
  b) the ANI information for causing a data base to be accessed to retrieve information related to one or more methods of billing allowed by a proprietor of a telephone associated with the ANI information, and displaying the methods of billing information on the display,
  c) TNI information for causing a data base to be accessed to retrieve called party information and displaying the called party information on the display, and
  d) said processor preventing a call to be processed in accordance with a method of billing indicated in the data base as not being allowed.

33. The operator terminal of claim 32, wherein said processor accesses a data base for obtaining LATA data and providing a display of the method of billing information if LATA restrictions are approved with respect to a call.

34. The operator terminal of claim 32, wherein in response to receipt of the ANI information, said processor displays a dedicated windowed area having calling party information therein.

35. The operator terminal of claim 32, wherein in response to receipt of the TNI information, said processor displays a dedicated windowed area having called party information therein.

36. The operator terminal of claim 32, wherein said processor displays method of billing information in a dedicated windowed area.

37. The operator terminal of claim 32, wherein a calling party window area, a called party window area and a method of billing window area are continuously displayed on said display for substantially the duration of the operator's assistance to the calling party.

38. The operator terminal of claim 37, wherein respective local times are displayed in the calling party window area and the called party window area.

39. The operator terminal of claim 32, wherein a method of billing display provides a plurality of options selectable for billing a call, and wherein on selection of one said option, said processor causes an overlay method of billing menu to be generated, said processor further providing information in said overlay menu and spaces to be filled in via the operator by said keyboard.

40. The operator terminal of claim 39, wherein said processor receives keyboard information input by the operator for filling in said overlay menu, whereby said processor automatically erases said overlay menu.

41. The operator terminal of claim 32, wherein said data base has stored therein in association with each ANI information a plurality of flags indicating acceptable methods of billing calls initiated with a telephone set related thereto, and base on said flags, said processor allows and disallows calls to be completed based upon said flags.

42. The operator terminal of claim 41, wherein said processor locks out attempts of an operator to complete a call with a method of billing not allowed according to said flags.

43. The operator terminal of claim 41, wherein said processor displays allowed billing methods at one intensity, and the disallowed billing methods as a different intensity.

44. An operator terminal for use by an operator in assisting calling parties, comprising:
  a display for displaying information;
  audio equipment providing communications between an operator and a calling party;
  a keyboard for input of information by the operator;
  a memory for storing a program for carrying out call processing in response to incoming calls and keyboard inputs;
  a processor for carrying out instructions of said program, said processor responding to incoming calls and responsive to
   a) ANI information for causing a data base to be accessed to retrieve calling party information associated with the ANI information and displaying said calling party information on the display,
   b) TNI information for causing a data base to be accessed to retrieve called party information and displaying the called party information on the display, and
   c) LATA boundary information stored in the data base, and wherein said processor is programmed to compare TNI and ANI information with LATA boundary information and determine whether a call therebetween can be completed, and prevent a call to a destination in violation of LATA boundary restrictions.

45. A method of controlling a telephone operator terminal for providing assistance to calling parties, comprising the steps of:
  presenting a base display on a visual display associated with the terminal, said base display including,
   a) a dedicated display area for information related to a calling telephone set,
   b) a dedicated display area for information related to a called telephone set, and
   c) a dedicated area for information concerning a method of billing; and
  presenting an overlay window area on a portion of the base display in response to a keyboard entry by the operator, and providing at least one field in the overlay window area for entry therein by the operator of information for completing the call to a destination.

46. The method of claim 45, further including deleting the overlay window area by the operator terminal after the field has been filled in by the operator.

47. The method of claim 45, further including display said overlay window with text concerning options for processing a call, and responding to a selection of an option input by the operator by presenting a second overlay window area and at least a second field for entry therein of information by the operator.

* * * * *

UNITED STATES PATENT AND TRADEMARK OFFICE
CERTIFICATE OF CORRECTION

PATENT NO. : 5,210,789
DATED : May 11, 1993
INVENTOR(S) : Stanley E. Jeffus, et al.

It is certified that error appears in the above-identified patent and that said Letters Patent is hereby corrected as shown below:

Col. 30, lines 46 and 47, delete "further including a plurality of said operator terminals, each having", insert --wherein the operator terminals each have--.

Col. 30, line 59, after "display,", insert --said base display--.

Col. 30, line 60, delete "area", insert --textural display--.

Col. 30, line 65, delete "area", insert --textual display--.

Col. 31, line 6, delete "displaying", insert --causing display of--.

Col. 31, line 15, after "terminal", insert --system--.

Col. 31, lines 16 and 17, after "terminal", insert --system--.

Col. 31, line 25, after "for", insert --displaying--.

Col. 31, line 47, after "terminal", insert --system--.

UNITED STATES PATENT AND TRADEMARK OFFICE
CERTIFICATE OF CORRECTION

PATENT NO. : 5,210,789                    Page 2 of 3

DATED : May 11, 1993

INVENTOR(S) : Stanley E. Jeffus, et al.

It is certified that error appears in the above-identified patent and that said Letters Patent is hereby corrected as shown below:

Col. 31, line 52, after "billing", insert --textual--.

Col. 31, line 52, delete "area".

Col. 31, line 56, after "terminal", insert --system--.

Col. 31, line 61, delete "display area", insert --textual display--.

Col. 31, line 64, after "said", insert --predefined--.

Col. 31, line 65, delete "said".

Col. 31, line 67, before "calling", insert --predefined--.

Col. 31, line 67, after "areas,", insert --at least one--.

Col. 31, line 68, delete "windows", insert --window--.

Col. 32, line 4, delete "areas include areas", insert --area includes an area--.

UNITED STATES PATENT AND TRADEMARK OFFICE
CERTIFICATE OF CORRECTION

PATENT NO. : 5,210,789
DATED : May 11, 1993
INVENTOR(S) : Stanley E. Jeffus, et al.

It is certified that error appears in the above-identified patent and that said Letters Patent is hereby corrected as shown below:

Col. 32, line 6, delete "areas are", insert --area is--.
    Col. 32, line 7, delete "areas", insert --area--.
    Col. 32, line 10, delete "display areas display", insert --textual display displays--.
    Col. 32, line 11, delete ", and display", insert --and--.
    Col. 32, line 57, delete "with associated", insert --by--.
    Col. 33, line 24, delete "providing", insert --provides--.
    Col. 33, line 36, after "displays", insert --said--.

Signed and Sealed this

Fifteenth Day of March, 1994

Attest:

BRUCE LEHMAN

*Attesting Officer*      *Commissioner of Patents and Trademarks*